(12) United States Patent
Clark et al.

(10) Patent No.: US 11,693,432 B1
(45) Date of Patent: Jul. 4, 2023

(54) SYSTEM AND METHOD FOR AUTONOMOUSLY CONTROLLING A SET OF UNMANNED AERIAL VEHICLES

(71) Applicant: BlueHalo, LLC, Huntsville, AL (US)

(72) Inventors: Alexis Henry Clark, Owens Crossroads, AL (US); David Beck, Madison, AL (US)

(73) Assignee: BlueHalo, LLC, Huntsville, AL (US)

( * ) Notice: Subject to any disclaimer, the term of this patent is extended or adjusted under 35 U.S.C. 154(b) by 0 days.

(21) Appl. No.: 17/881,277

(22) Filed: Aug. 4, 2022

Related U.S. Application Data

(60) Provisional application No. 63/345,238, filed on May 24, 2022.

(51) Int. Cl.
*B64C 39/02* (2023.01)
*G05D 1/00* (2006.01)
*H04W 4/42* (2018.01)
*G05D 1/10* (2006.01)
*B64U 50/19* (2023.01)

(52) U.S. Cl.
CPC ........... *G05D 1/104* (2013.01); *B64C 39/024* (2013.01); *G05D 1/1064* (2019.05); *H04W 4/42* (2018.02); *B64U 50/19* (2023.01); *B64U 2201/102* (2023.01); *B64U 2201/104* (2023.01); *B64U 2201/20* (2023.01)

(58) Field of Classification Search
CPC ........ G05D 1/104; G05D 1/1064; G05D 1/00; B64C 39/024; B64C 2201/042; B64C 2201/143; B64C 2201/145; B64C 2201/146; B64C 39/02; H04W 4/42; H04W 4/00
See application file for complete search history.

(56) References Cited

U.S. PATENT DOCUMENTS

| | | | |
|---|---|---|---|
| 5,349,294 A | 9/1994 | Kasuboski | |
| 7,750,841 B2 | 7/2010 | Oswald et al. | |
| 10,403,161 B1 | 9/2019 | Bry et al. | |
| 10,571,561 B2 | 2/2020 | Zorea et al. | |
| 10,600,295 B2* | 3/2020 | Kempel | G08B 13/19608 |
| 11,420,756 B1* | 8/2022 | Moy | B64D 27/24 |
| 2011/0184590 A1* | 7/2011 | Duggan | G05D 1/0088 701/2 |

(Continued)

FOREIGN PATENT DOCUMENTS

| | | | | |
|---|---|---|---|---|
| EP | 2879012 A1 * | 6/2015 | ......... | B64C 39/024 |
| WO | 2010138696 A1 | 12/2010 | | |
| WO | WO-2018218370 A1 * | 12/2018 | ............... | B64C 1/26 |

*Primary Examiner* — Yonel Beaulieu
(74) *Attorney, Agent, or Firm* — Amster, Rothstein & Ebenstein LLP

(57) ABSTRACT

A system and method for autonomously controlling a set of unmanned aerial vehicles is provided. The autonomous ground control system may include a communications module and a fleet configuration module in communication with one or more user interface applications. The autonomous ground control system may receive one or more flight commands and generate fleet configuration instructions and safety information. The autonomous ground control system may provide the fleet configuration instructions to each unmanned aerial vehicle in the set in order to carry out the fleet configuration instructions in real time.

28 Claims, 17 Drawing Sheets

(56) References Cited

U.S. PATENT DOCUMENTS

| | | | |
|---|---|---|---|
| 2014/0008496 A1* | 1/2014 | Ye | B64C 13/20 |
| | | | 244/190 |
| 2014/0172194 A1* | 6/2014 | Levien | G08G 5/0069 |
| | | | 701/2 |
| 2016/0293018 A1 | 10/2016 | Kim et al. | |
| 2018/0139152 A1 | 5/2018 | Shaw et al. | |
| 2019/0023392 A1 | 1/2019 | Micros | |
| 2019/0260768 A1* | 8/2019 | Mestha | H04L 63/1466 |
| 2019/0355145 A1 | 11/2019 | Bruner | |

\* cited by examiner

CONTINUED FROM STEP S806 OF FIG. 8A

S902: obtaining, by a respective unmanned aerial vehicle communications module implemented by a respective autonomous unmanned aerial vehicle control system associated with the respective unmanned aerial vehicle via a respective translator module implemented by the respective autonomous unmanned aerial vehicle control system, the respective fleet configuration instructions S904: obtaining, by the respective unmanned aerial vehicle communications module from a respective unmanned aerial vehicle positioning system, respective proximity information associated with each unmanned aerial vehicle of the set of unmanned aerial vehicles S906: determining in real time, by a swarm controller implemented by the autonomous unmanned aerial vehicle controller system, whether the respective proximity information associated with the respective unmanned aerial vehicle of the set of unmanned aerial vehicles indicates a distance between the respective unmanned aerial vehicle and any other object is below a predetermined threshold S908: in the case where the respective proximity information indicates a distance below the predetermined threshold between the respective unmanned aerial vehicle and any other object, updating, by the swarm controller, the respective fleet configuration instructions based on the respective proximity information and transmitting, by the swarm controller, the updated respective fleet configuration instructions to a respective flight controller of the respective unmanned aerial vehicle

CONTINUED FROM STEP S908 OF FIG. 9B

FIG. 9A

SYSTEM AND METHOD FOR AUTONOMOUSLY CONTROLLING A SET OF UNMANNED AERIAL VEHICLES

CROSS-REFERENCE TO RELATED APPLICATION

The present application claims benefit of and priority to U.S. Provisional Patent Application Ser. No. 63/345,238 filed May 24, 2022 entitled SYSTEM AND METHOD FOR AUTONOMOUSLY CONTROLLING A SET OF UNMANNED AERIAL VEHICLES, the entire content of which is hereby incorporated by reference herein.

FIELD OF THE INVENTION

The present invention generally relates to a system and method for autonomously controlling a set of unmanned aerial vehicles.

BACKGROUND

Conventional unmanned aerial vehicles are typically controlled manually by a single operator. That operator may typically be required to control a single unmanned aerial vehicle at a time due to the potential cognitive overload created by said operator manually directing the aerial movement of multiple unmanned aerial vehicles simultaneously.

In conventional unmanned aerial vehicle swarm systems involving a set of unmanned aerial vehicles, such direct one on one control is generally not possible as the set of unmanned aerial vehicles is typically controlled with a preprogrammed flight profile. As a result, the operator of the set of unmanned aerial vehicles is unable to directly control the movement of individual unmanned aerial vehicles in the set, and is unable to dynamically adjust the flight path or movement of the set, which may result in failure of one or more unmanned aerial vehicle in the set. For example, the lack of direct one on one control of the set of unmanned aerial vehicles presents problems since the status and performance of each of the unmanned aerial vehicles in the set of unmanned aerial vehicles may be different such that one or more of the unmanned aerial vehicles in the set of unmanned aerial vehicles may not be able to complete the preprogrammed flight profile and/or may not be able to do so safely. Conventional swarm control systems do not allow for the ability to adjust to such a situation. For example, one or more of the unmanned aerial vehicles may not have sufficient battery power to complete the program and the preprogrammed flight profile simply does not account for this problem which may led to mission failure. During the course of carrying out the preprogrammed flight profile, the set of unmanned aerial vehicles must overcome other problems associated with the swarm, such as avoiding the other unmanned aerial vehicles in the swarm as well as, at the same time, avoiding other obstacles in the environment, such as power lines, buildings, terrain changes, etc. Another problem with conventional unmanned aerial vehicle swarm systems is that the swarm may not receive flight commands from multiple operators in different locations simultaneously due the risk of collision that may be caused by the set of unmanned aerial vehicles processing multiple commands simultaneously and being unable to adjust for safety risks automatically.

Accordingly, it would be desirable to provide an autonomous ground control system for controlling a set of unmanned aerial vehicles that avoids these and other problems.

SUMMARY

In view of the above, it is the object of the present disclosure to provide a system and method to overcome the technological challenges faced in conventional unmanned aerial vehicles operating as a swarm.

In particular, it is an object of the present disclosure to provide a method and system for autonomously controlling a set of unmanned aerial vehicles operating as a swarm such that flight commands, which may be provided by one or more operators, may be carried out by all unmanned aerial vehicles of the set of unmanned aerial vehicles while mitigating collision risks and task failures. In embodiments, the technical problems associated with control of a set of unmanned aerial vehicles may be overcome by providing a ground control system that receives flight commands, which may be from one or more operators, and generates fleet configuration instructions to control the set of unmanned aerial vehicles as well as safety information associated with the availability of each of the unmanned aerial vehicles to carry out the fleet configuration instructions. Fleet configuration instructions are only transmitted to the set of unmanned aerial vehicles if it is determined that all unmanned aerial vehicles are available to operate in accordance with the fleet configuration instructions based on the safety information. Otherwise, the operators are notified. Further, each unmanned aerial vehicle determines on a real time basis whether flight commands based on the fleet configuration instructions that are transmitted will result in collision or failure of each respective unmanned aerial vehicle and modifies the fleet configuration instructions to avoid collision or failure.

A method for autonomously controlling a set of unmanned aerial vehicles in accordance with an embodiment of the present disclosure includes: a) obtaining, by a fleet configuration module implemented by an autonomous ground control system including one or more computer systems, one or more flight commands associated with three-dimensional movement of the set of unmanned aerial vehicles from one or more user devices associated with the autonomous ground control system; b) generating, by the fleet configuration module, respective fleet configuration instructions and respective safety information for each unmanned aerial vehicle of the set of unmanned aerial vehicles, by the steps of: i. generating, by the fleet configuration module, first respective fleet configuration instructions for each unmanned aerial vehicle of the set of unmanned aerial vehicles based on the one or more flight commands; ii. generating, by the fleet configuration module, the respective safety information associated with each unmanned aerial vehicle in the set of unmanned aerial vehicles based on the respective fleet configuration instructions, wherein the respective safety information indicates availability of each respective unmanned aerial vehicle in the set of unmanned aerial vehicles for carrying out the one or more flight commands with respect to predetermined parameters; iii. determining, by the fleet configuration module, whether each unmanned aerial vehicle in the set of unmanned aerial vehicles is equipped to carry out the one or more flight commands based at least on the respective safety information; iv. in the case where the respective safety information indicates that any unmanned aerial vehicle in the set of unmanned aerial vehicles is not equipped to carry out the one or more flight commands, publishing, by the fleet configuration module, the respective safety information to the one or more user devices; v. in the case where the respective safety information indicates that each unmanned aerial vehicle in the set of unmanned aerial vehicles is equipped to carry out the one or more flight commands, designating, by the fleet configuration module, the first respective fleet configuration instructions as the respective fleet configuration instructions based on the respective safety information; vi. storing, in a memory, the respective fleet configuration instructions associated with each unmanned aerial vehicle of the set of unmanned aerial vehicles; c) publishing, via a communications module implemented by the autonomous ground control system, the respective fleet configuration instructions to each unmanned aerial vehicle of the set of unmanned aerial vehicles; d) receiving, by the communications module, respective three-dimensional position information associated with each unmanned aerial vehicle in the set of unmanned aerial vehicles; and e) publishing, by the communications module, an updated configuration of the set of unmanned aerial vehicles to the one or more user devices based on the respective three-dimensional position information of each unmanned aerial vehicle of the set of unmanned aerial vehicles.

In embodiments, the one or more flight commands are obtained from the one or more devices via the communications module.

In embodiments, the one or more flight commands are obtained from the one or more devices via a user interface application.

In embodiments, the user interface application is displayed on the one or more user devices.

In embodiments, the one or more flight commands are obtained remotely by a wireless connection via the Internet.

In embodiments, the wireless connection is a secure connection.

In embodiments, the one or more flight commands are obtained locally by a wireless connection via radio frequency communication.

In embodiments, the wireless connection is a secure connection.

In embodiments, the one or more flight commands are received by a wired connection.

In embodiments, the predetermined parameters include battery level and the safety information includes battery level information associated with a respective battery level of each unmanned aerial vehicle in the set of unmanned aerial vehicles.

In embodiments, the predetermined parameters include mission status and the safety information includes respective mission status information associated with respective mission information loaded onto each unmanned aerial vehicle in the set of unmanned aerial vehicles.

In embodiments, the predetermined parameters include geographic status and the safety information includes geographic status information associated with respective geo-location information loaded onto each unmanned aerial vehicle in the set of unmanned aerial vehicles.

In embodiments, the predetermined parameters include position and the safety information includes respective GPS information associated with each unmanned aerial vehicle in the set of unmanned aerial vehicles.

In embodiments, the determining step includes determining whether the respective battery level information indicates a respective battery level over a threshold.

In embodiments, the determining step includes determining that the respective mission status information is present.

In embodiments, the determining step includes determining that the respective geographic status information is present.

In embodiments, the determining step includes determining that sufficient GPS is available based on the respective GPS information.

In embodiments, each unmanned aerial vehicle includes a respective navigation system.

In embodiments, each respective navigation system is configured to generate three-dimensional position information in real time.

In embodiments, the method further includes publishing the updated configuration to the one or more user devices via the one or more respective user interface applications.

In embodiments, the method further includes publishing, by the respective autonomous unmanned aerial vehicle control system of the respective unmanned aerial vehicle, the respective updated configuration of the respective unmanned aerial vehicle to the one or more user devices via the one or more respective user interface applications.

A method for autonomously controlling a set of unmanned aerial vehicles in accordance with an embodiment of the present disclosure includes each respective unmanned aerial vehicle performing the steps of: 1. obtaining, by a respective unmanned aerial vehicle communications module implemented by a respective autonomous unmanned aerial vehicle control system associated with the respective unmanned aerial vehicle via a respective translator module implemented by the respective autonomous unmanned aerial vehicle control system, the respective fleet configuration instructions wherein the respective unmanned aerial vehicle is associated with a respective role in the set of unmanned aerial vehicles; 2. obtaining, by the respective unmanned aerial vehicle communications module from a respective unmanned aerial vehicle positioning system, respective proximity information associated with each unmanned aerial vehicle of the set of unmanned aerial vehicles, wherein the proximity information indicates a respective distance between each unmanned aerial vehicle of the set of unmanned aerial vehicles and all other objects in an area of interest including the other unmanned aerial vehicles of the set of unmanned aerial vehicles; 3. determining in real time, by a swarm controller implemented by the autonomous unmanned aerial vehicle control system, whether the respective proximity information associated with the respective unmanned aerial vehicle of the set of unmanned aerial vehicles indicates a distance between the respective unmanned aerial vehicle and any other object is below a predetermined threshold; 4. in the case where the respective proximity information indicates a distance below the predetermined threshold between the respective unmanned aerial vehicle and any other object, updating, by the swarm controller, the respective fleet configuration instructions based on the respective proximity information and transmitting, by the swarm controller, the updated respective fleet configuration instructions to a respective flight controller of the respective unmanned aerial vehicle; 5. in the case where the respective proximity information indicates that the distance between the respective unmanned aerial vehicle in the set of unmanned aerial vehicles and any other object is at or above the predetermined threshold, transmitting, by the swarm controller, the respective fleet configuration instructions to the respective flight controller; and 6. generating, by the respective flight controller, a plurality of control signals to direct movement of the respective unmanned aerial vehicle based on the respective fleet configuration instructions.

In embodiments, the respective fleet configuration instructions are obtained by the respective unmanned aerial vehicle communications module from a communications module implemented by an autonomous ground control system including one or more computer systems.

In embodiments, the respective role is an individual role.

In embodiments, the respective role is a swarm role.

In embodiments, the respective role is determined based on a predetermined mode of operation associated with the set of unmanned aerial vehicles.

In embodiments, the predetermined mode of operation is a mission task mode.

In embodiments, the predetermined mode of operation is a collision avoidance mode.

In embodiments, the predetermined mode of operation is a surveillance mode.

In embodiments, the predetermined mode of operation is a swarm mode.

In embodiments, the respective proximity information includes potential collision information.

In embodiments, the respective proximity information further includes a respective three-dimensional direction.

In embodiments, the respective proximity information further includes respective time information associated with each respective distance.

In embodiments, the at least one other object is one of the unmanned aerial vehicles of the set of unmanned aerial vehicles.

In embodiments, the at least one other object is a stationary object.

In embodiments, the at least one other object is a stationary object and the proximity information is determined based on predetermined location information associated with the stationary object.

In embodiments, the at least one other object is an unmanned aerial vehicle outside the set of unmanned aerial vehicles.

In embodiments, the fleet configuration instructions are transmitted to the respective flight controller via a respective flight controller gateway, wherein the respective flight controller gateway is configured to filter respective fleet configuration instructions based on the respective role and the predetermined mode of operation.

In embodiments, steps 2.-6. are repeated in real time during one or more periods of time.

In embodiments, steps 2.-6. are repeated until the fleet configuration instructions are completed.

BRIEF DESCRIPTION OF THE DRAWINGS

The above and related objects, features and advantages of the present disclosure will be more fully understood by reference to the following detailed description of the preferred, albeit illustrative, embodiments of the present invention when taken in conjunction with the accompanying figures, wherein:

FIGS. 9A and 9B are process flows for a method for autonomously controlling a set of unmanned aerial vehicles in accordance with embodiments of the present invention.

DETAILED DESCRIPTION OF THE EXEMPLARY EMBODIMENTS

The present invention generally relates to a system and method for autonomously controlling a set of unmanned aerial vehicles. In embodiments, the autonomously control system may autonomously control the set of unmanned aerial vehicles safely such that aerial tasks may be carried out by the set of unmanned aerial vehicles while mitigating collision risks and task failure.

Figure 1:
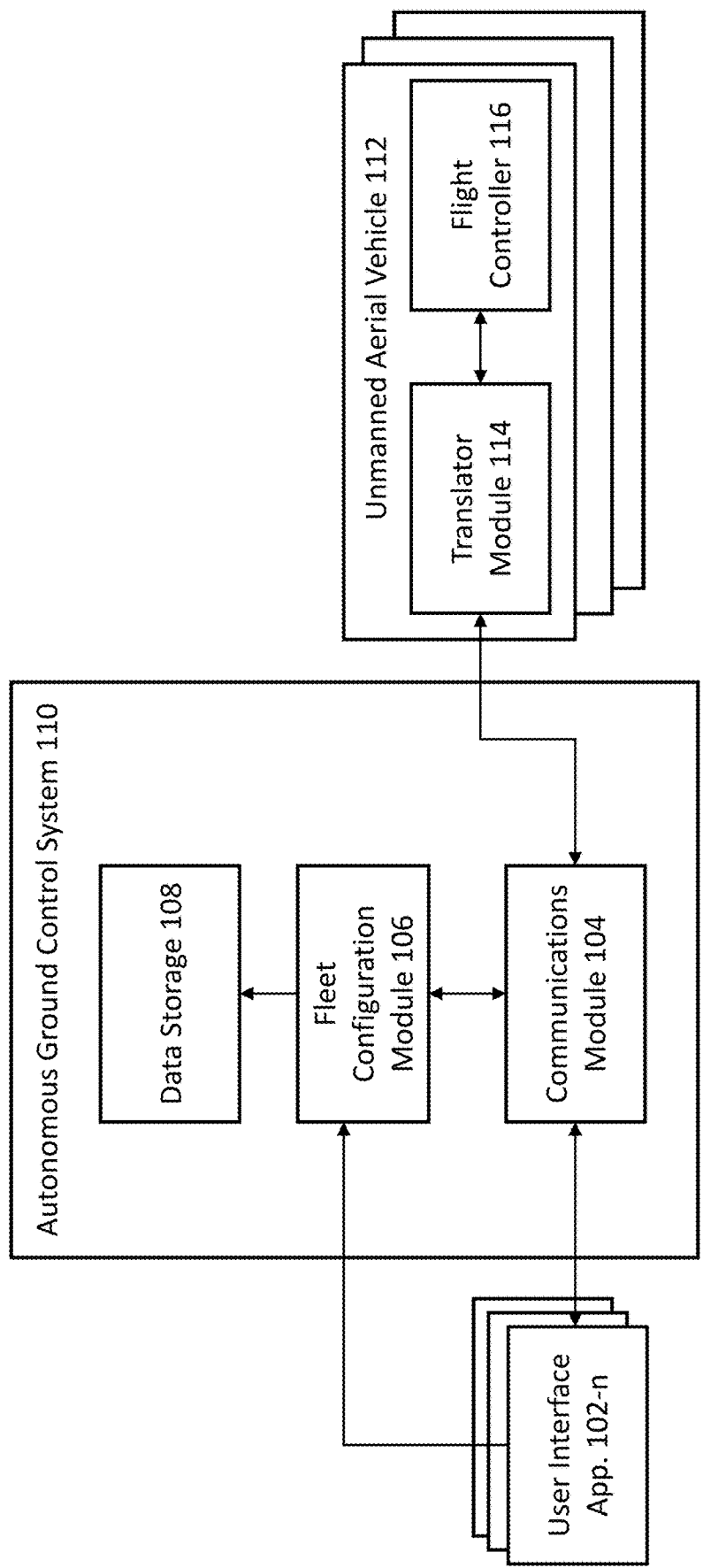
FIG. 1 is a schematic diagram of an autonomous ground control system for autonomously controlling a set of unmanned aerial vehicles in accordance with embodiments of the present invention.

FIG. 1 is a schematic diagram of an autonomous ground control system 110 for autonomously controlling a set of unmanned aerial vehicles 112 in accordance with embodiments of the present invention. In embodiments, the autonomous ground control system 110 may include a communications module 104, a fleet configuration module 106, one or more user interface applications 102, and data storage 108. In embodiments, the communications module 104 and fleet configuration module 106 may each be one or more software modules. In embodiments, the autonomous ground control system 110 may be embodied in a computer which includes one or more processors and memory. In embodiments, the one or more software modules may be configured to execute instructions stored in the memory. In embodiments, the processor of the autonomous ground control system 110 may be used to implement the modules based on instructions provided from the memory. In embodiments, the autonomous ground control system 110 may be embodied in a distributed cloud-based system where the modules are located in one or more locations. In embodiments, one or more computer systems of the autonomous ground control system 110 may be a part of a group of operatively connected servers located remotely. In embodiments, one or more computer systems of the autonomous ground control system 110 may be located on a local server. In embodiments, one or more computer systems of the autonomous ground control system 110 may be located on an enterprise server.

In embodiments, the one or more user interface applications 102 may be located on the autonomous ground control station 110. In embodiments, the one or more user interface applications 102 may be a web application which may connect to a client either locally or remotely. In embodiments, the web application may be loaded and stored on a user device. In embodiments, flight commands may be entered by a user of the user device and received by the communications module 104 by the respective user interface application 102. In embodiments, the communications module 104 may receive one or more flight commands associated with three-dimensional movement of a set of unmanned aerial vehicles 112. In embodiments, the fleet configuration module 106 implemented by the autonomous ground control system 110 may obtain one or more flight commands associated with three-dimensional movement of the set of unmanned aerial vehicles 112 from the one or more user devices associated with the autonomous ground control system 110. In embodiments, the one or more flight commands may be obtained from the one or more devices via the communications module 104. In embodiments, the one or more flight commands may be received from one or more user devices via one or more respective user interface applications 102 associated with the autonomous ground control system 110. In embodiments, the user interface application is displayed on the one or more user devices. In embodiments, the one or more flight commands may be obtained by the communications module 104 remotely by a wireless connection via the Internet. In embodiments, the one or more flight commands may be obtained by the fleet configuration module 106 remotely by a wireless connection via the Internet. For example, in embodiments, a user operating a user device located remotely from the autonomous ground control station 110 (e.g., out of range of RF communications) may provide flight commands for the set of unmanned aerial vehicles 112 via the user interface application 102 stored on the user device. In embodiments, the flight commands may be communicated to the autonomous ground control station 110 via a secure connection such as a Web Socket API protocol. Web Socket is a communications protocol which allows for full two-way communication channels over a single Transmission Control Protocol (TCP) connection. A secure connection may be a connection that is encrypted by one or more security protocols to ensure the security of data flowing between two or more nodes. In embodiments, other secure connections may be used. For example, other security protocols such as HTTPS, POP3, and IMAP, to name a few.

In embodiments, the one or more flight commands may be obtained by the fleet configuration module 106 locally by a wireless connection via the Internet. In embodiments, the one or more flight commands may be received by the communications module 104 locally by a wireless connection via the Internet. For example, in embodiments, a user operating a user device located proximately to the autonomous ground control station 110 may provide flight commands for the set of unmanned aerial vehicles 112 via the user interface application 102 stored on the user device. In embodiments, the flight commands may be communicated to the autonomous ground control station 110 via a secure connection. In embodiments, the one or more flight commands may be received by the communications module 104 locally by a wired connection. For example, in embodiments, a user operating a user device located proximately to the autonomous ground control station 110 and operatively connected to the autonomous ground control station 110, may provide flight commands for the set of unmanned aerial vehicles 112 via the user interface application 102. In embodiments, the one or more flight commands may be obtained by the fleet configuration module 106 locally by a wireless connection via radio frequency communication. In embodiments, the one or more flight commands may be obtained by the communications module 104 locally by a wireless connection via radio frequency communication. For example, a user operating a user device located proximately to the autonomous ground control station 110 (e.g., within range of RF communications) may provide flight commands using RF signals for the set of unmanned aerial vehicles 112 via the user interface application 102 stored on the user device.

In embodiments, the communications module 104 may provide the received one or more flight commands to the fleet configuration module 106. In embodiments, the fleet configuration module 106 may receive the one or more flight commands from the communications module 104. In embodiments, the fleet configuration module 106 may run on the one or more computer systems of the autonomous ground control system 110. In embodiments, the fleet configuration module 106 may receive the one or more flight commands from the one or more user interface applications 102 directly. In embodiments, the fleet configuration module 106 may generate fleet configuration instructions for each unmanned aerial vehicle in the set of unmanned aerial vehicles 112 based on the one or more flight commands. In embodiments, for example, the fleet configuration instructions may include protocols for directing the three-dimensional movement of each unmanned aerial vehicle in the set of unmanned aerial vehicles 112 to conform with the desired configuration of the set of unmanned aerial vehicles 112 indicated by the one or more flight commands. In embodiments, the fleet configuration module 106 may implement one or more predetermined algorithms for calculating the three-dimensional position of the set of unmanned aerial vehicles 112 based on the one or more flight commands.

In embodiments, the fleet configuration module 106 may be configured to generate respective fleet configuration instructions and respective safety information for each unmanned aerial vehicle of the set of unmanned aerial vehicles 112. In embodiments, the fleet configuration module 106 may be configured to generate first respective fleet configuration instructions and for each unmanned aerial vehicle of the set of unmanned aerial vehicles 112 based on the one or more flight commands. In embodiments, the respective fleet configuration instruction may include fleet configuration instructions for each unmanned aerial vehicle. In embodiments, the one or more flight commands may be adding or removing an unmanned aerial vehicle from the set of unmanned aerial vehicles 112. In embodiments, the one or more flight commands may be an indication of geographic fencing. In embodiments, the one or more flight commands may be a command for the set of unmanned aerial vehicles 112 to carry out a task or rally at a certain location in space. In embodiments, the fleet configuration module 106 may determine whether flight commands for one or more of the unmanned aerial vehicles may affect the rest in the set of unmanned aerial vehicles 112. For example, if a flight command is directed to the three-dimensional movement of one unmanned aerial vehicle in the set, the fleet configuration module 106 may calculate the path which needs to be taken to avoid collision and proceed to the desired position.

In embodiments, the fleet configuration module 106 may be configured to generate respective safety information associated with each unmanned aerial vehicle in the set of unmanned aerial vehicles 112 based on the respective fleet configuration instructions. In embodiments, the respective safety information may indicate an availability of each respective unmanned aerial vehicle in the set of unmanned aerial vehicles 112 for carrying out the one or more flight commands with respect to one or more predetermined parameters. For example, in embodiments, the predetermined parameters may include battery level information and the safety information may include battery level information associated with a respective battery level of each unmanned aerial vehicle in the set of unmanned aerial vehicles 112. In embodiments, the predetermined parameters may include mission status and the safety information may include respective mission status information associated with respective mission information loaded onto each unmanned aerial vehicle in the set of unmanned aerial vehicles 112. For example, in embodiments, the mission status information may include an indication of whether a mission file has been loaded properly onto one or more computer systems on a respective unmanned aerial vehicle in the set.

In embodiments, the predetermined parameters may include geographic status and the safety information may include geographic status information associated with respective geolocation information loaded onto each unmanned aerial vehicle in the set of unmanned aerial vehicles 112. For example, in embodiments, the geographic status information may include an indication of whether a geofencing file has been properly loaded onto one or more computer systems on a respective unmanned aerial vehicle in the set 112.

In embodiments, the predetermined parameters may include position information and the safety information include may respective GPS information associated with each unmanned aerial vehicle in the set of unmanned aerial vehicles 112. In embodiments, for example, the respective GPS information may include an indication of a number of available GPS satellites. In embodiments, the respective GPS information may include an indication of whether GPS service is available.

In embodiments, the fleet configuration module 106 may determine whether each unmanned aerial each unmanned aerial vehicle in the set of unmanned aerial vehicles 112 is equipped to carry out the one or more flight commands based at least on the respective safety information. For example, in embodiments, the determining step may include determining whether the respective battery level information indicates a respective battery level over a threshold. In embodiments, the determining step may include determining that the respective mission status information is loaded properly. In embodiments, the determining step may include determining that the respective geographic status information is present. For example, in embodiments, the geographic status information may indicate that the fleet configuration instructions may be performed within a geographic limitation. In embodiments, the determining step may include determining that sufficient GPS coverage is available based on the respective GPS information. For example, in embodiments, the respective GPS information may indicate that the number of available GPS satellites is above a sufficient number to carry out the flight configuration instructions. In embodiments, the GPS information may indicate that GPS is operational and available.

In embodiments, in the case where the respective safety information indicates that any unmanned aerial vehicle in the set of unmanned aerial vehicles 112 is not equipped to carry out the one or more flight commands, the fleet configuration module 106 may publish the respective safety information to the one or more user devices to notify operators of the inability of one or more of the unmanned aerial vehicles 112 to perform the flight commands. In embodiments, the respective safety information may be published to the one or more user devices via the one or more respective user interface applications. In embodiments, the respective safety information may be provided by the fleet configuration module 106 to the communications module 104, which may then publish the respective safety information to the one or more user devices. In embodiments, if the respective safety information indicates that any unmanned aerial vehicle in the set of unmanned aerial vehicles is not equipped to carry out the one or more flight commands, the fleet configuration module 106 may not publish fleet configuration instructions to any of the unmanned aerial vehicles.

In embodiments, in the case where the respective safety information indicates that each unmanned aerial vehicle in the set of unmanned aerial vehicles 112 is equipped to carry out the one or more flight commands, the fleet configuration module 106 may designate the first respective fleet configuration instructions as the respective fleet configuration instructions based on the respective safety information. In embodiments, the designation of the fleet configuration instructions may be indication the fleet configuration instructions are safe and final and may be published to each unmanned aerial vehicle in the set of unmanned aerial vehicles 112.

In embodiments, the fleet configuration module 106 may store the respective fleet configuration instructions associated with each unmanned aerial vehicle in the set of unmanned aerial vehicles 112 in a memory. In embodiments, the memory may be a data storage 108. In embodiments, the data storage 108 may be a hard drive or may be cloud-based for example, to name a few.

In embodiments, the communications module 104 implemented by the autonomous ground control system 110 may be configured to publish the respective fleet configuration instructions to each unmanned aerial vehicle of the set of unmanned aerial vehicles 112. In embodiments, the respective fleet configuration instructions published to each unmanned aerial vehicle may be tailored specifically to each unmanned aerial vehicle. In embodiments, the respective fleet configuration instructions published to each unmanned aerial vehicle may be the same fleet configuration instructions and each unmanned aerial vehicle may be configured to parse the relevant configuration information to the respective unmanned aerial vehicle.

In embodiments, the fleet configuration module 106 may be configured to determine proximity information for each unmanned aerial vehicle of the set of unmanned aerial vehicles 112 based on the configuration instructions and the one or more flight commands. In embodiments, the proximity information may include potential collision information. In embodiments, the proximity information may indicate a distance between each unmanned aerial vehicle of the set of unmanned aerial vehicles and all other objects in an area of interest. In embodiments, the proximity information may include information related to the potential three-dimensional distances reached between each unmanned aerial vehicle during the flight of the one or more unmanned aerial vehicles to reach the desired configuration or position indicated by the configuration instructions. In embodiments, the fleet configuration module 106 may determine whether flight commands for one or more of the unmanned aerial vehicles may affect the rest in the set of unmanned aerial vehicles 112. For example, if a flight command is directed to the three-dimensional movement of one unmanned aerial vehicle in the set, the fleet configuration module 106 may calculate the path which needs to be taken to avoid collision and proceed to the desired position.

In embodiments, the fleet configuration module 106 may determine whether respective proximity information associated with at least one unmanned aerial vehicle of the set of unmanned aerial vehicles 112 indicates a distance between at least one unmanned aerial vehicle and any other object is below a predetermined threshold. In embodiments, the determination may be made across the calculated path of each unmanned aerial vehicle in the set of unmanned aerial vehicles 112.

In embodiments, in the case where the proximity information indicates a distance below a predetermined threshold between at least one unmanned aerial vehicle of the set of unmanned aerial vehicles 112 and any other object, the fleet configuration module 106 may update the fleet configuration instructions. In embodiments, the fleet configuration module 106 may also update the proximity information based on the updated fleet configuration instructions. In embodiments, the determination of whether respective proximity information associated with at least one unmanned aerial vehicle of the set of unmanned aerial vehicles indicates a distance between the at least one unmanned aerial vehicle and any other object is below a predetermined threshold may be repeated based on the updated proximity information.

In embodiments, the at least one other object may be one of the set of unmanned aerial vehicles 112. In embodiments, the at least one other object may be a stationary object. In embodiments, the at least one other object may be a stationary object or terrain feature and the proximity information may be determined based on predetermined location information associated with the stationary object. In embodiments, the at least one other object may be a manned or unmanned aerial vehicle outside the set of unmanned aerial vehicles. In embodiments, the predetermined threshold may be a three-dimensional distance where if the fleet configuration module 106 determines that at least one of the set of unmanned aerial vehicles 112 will be within the threshold during the time of flight, the configuration instructions will be rejected as unsafe.

In embodiments, in the fleet configuration instructions may be updated until the proximity information indicates that the distance between each of the unmanned aerial vehicles in the set of unmanned aerial vehicles 112 and any other objects is at or above the predetermined threshold. In embodiments, the recalculating of fleet configuration instructions may be determined by a set of predetermined algorithms within the fleet configuration module which may adjust the flight path of the set of unmanned aerial vehicles so as to avoid collisions. In embodiments, this may allow the autonomous ground control system 110 to direct the movement of a set of unmanned aerial vehicles 112 without a risk of collision amongst the set as well as with other objects.

In embodiments, in the case where the proximity information indicates that the distance between each of the unmanned aerial vehicles in the set of unmanned aerial vehicles and any other object is at or above the predetermined threshold, the fleet configuration module 106 may provide the fleet configuration instructions to the communications module 104. In embodiments, the communications module 104 may transmit the fleet configuration instructions (or updated fleet configuration instructions) by publishing the fleet configuration instructions to each unmanned aerial vehicle in the set of unmanned aerial vehicles 112. In embodiments, all fleet configuration instructions may be published to each unmanned aerial vehicle. In embodiments, the communications module 104 may parse the fleet configuration instructions relevant to each unmanned aerial vehicle and transmit the pertinent fleet configuration instructions to each respective unmanned aerial vehicle. In embodiments, the fleet configuration instructions may be transmitted by radio frequency communications to each unmanned aerial vehicle. In embodiments, the autonomous ground control 110 may include a transceiver for transmitting and receiving radio signals to and from the set of unmanned aerial vehicles 112. In embodiments, fleet configuration instructions and/or proximity information may be stored in data storage 108. In embodiments, data storage 108 may be persistence services which may store a log of position information associated with the set of unmanned aerial vehicles 112.

Figure 2:
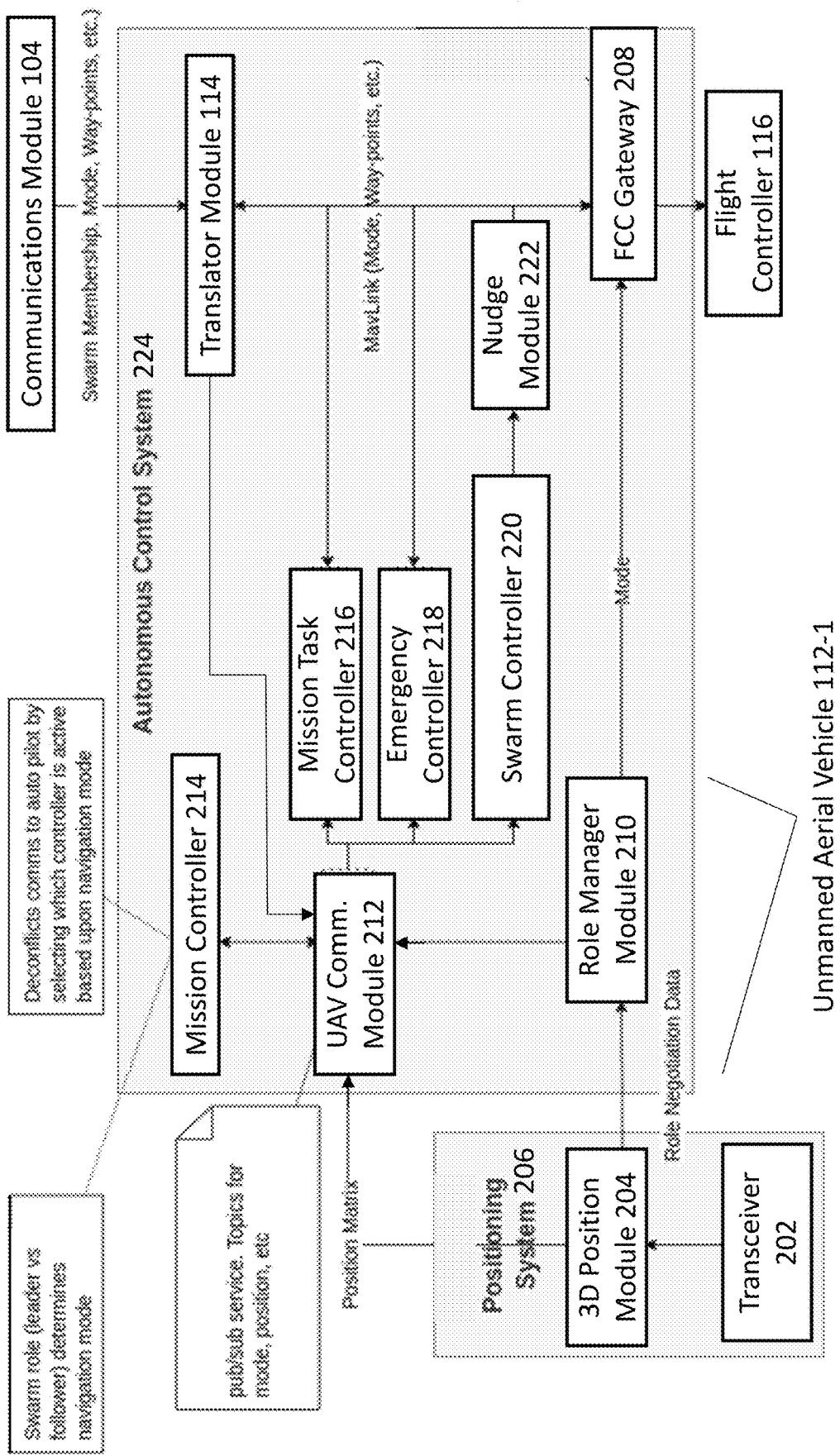
FIG. 2 is a schematic diagram of an unmanned aerial vehicle in a set of unmanned aerial vehicles in accordance with embodiments of the present invention.

FIG. 2 is a schematic diagram of an unmanned aerial vehicle 112-1 in a set of unmanned aerial vehicles 112 in accordance with embodiments of the present invention. In embodiments, the unmanned aerial vehicle 112-1 may include an autonomous control system 224, a positioning system 206, and a flight controller 116. In embodiments, each of the autonomous control system 224 and the positioning system 206 may include a respective computer. In embodiments, the autonomous control system 224 and position system 206 may use the same computer located in the unmanned aerial vehicle 112-1. In embodiments, the positioning system 206 may be configured to generate a set of range determinations with respect to each unmanned aerial vehicle 112 in the set of unmanned aerial vehicles. In embodiments, the respective computer of the position system 206 and the autonomous control system 224 may each include a respective processor and memory. In embodiments, the processor may be included in and/or operably connected to the respective computer. In embodiments, the computer may include one or more software modules and memory. In embodiments, the software modules may be configured to execute instructions stored in the memory of the computer via a processor or other processing element. In embodiments, the processor may be used to implement the modules based on instructions provided from the memory.

In embodiments, the positioning system 206 may include a transceiver 202 and a 3D position module 204. In embodiments, the transceiver 202 may transmit a plurality of range requests for receipt by the transceivers associated with each other unmanned aerial vehicle of the set of unmanned aerial vehicles 112. In embodiments, the transceiver 202 may receive responses to the requests from which range information may be determined. In embodiments, the unmanned aerial vehicle 112-1 may use the transceiver 202 to range between the set of unmanned aerial vehicles 112 in order to determine a position of the unmanned aerial vehicle 112-1 with respect to each respective unmanned aerial vehicle in the set of unmanned aerial vehicles 112. In embodiments, the transceiver 202 may use asymmetric double sided two-way ranging to determine a position of the unmanned aerial vehicle 112-1 with respect to each unmanned aerial vehicle in the set as described in U.S. Prov. Pat. App. No. 63/324,434, entitled "SYSTEM AND METHOD FOR DYNAMIC TWO-RANGING USING UNMANNED AERIAL VEHICLES". In embodiments, the ranging method may be dynamic without reference to a known anchor point. In embodiments, the 3D position module 204 may use filtered range information to generate three-dimensional position information for the first unmanned aerial vehicle 112-1 with respect to the other unmanned aerial vehicles in the set of unmanned aerial vehicles. In embodiments, the 3D position module 204 may generate a three-dimensional matrix of proximity information for the position of each unmanned aerial vehicle with respect to the first unmanned aerial vehicle to be provided to the autonomous control system 224. In embodiments, the 3D position module 204 may provide role negotiation data to the autonomous control system 224.

In embodiments, the autonomous control system 224 may include a translator module 114, a flight control gateway 208, role manager module 210, an unmanned aerial vehicle communications module 212, a mission controller 214, a mission task controller 216, an emergency controller 218, a swarm controller 220, and a nudge module 222. In embodiments, the modules may be one or more software modules configured to execute instructions stored in the memory of the respective computer via the processor or other processing element. In embodiments, each unmanned aerial vehicle may perform one or more steps in order to carry out the fleet configuration instructions transmitted by the communications module 104. In embodiments, the translator module 114 may be configured to receive the fleet configuration instructions. In embodiments, the fleet configuration instructions may include swarm membership information, mode information, and waypoint information, to name a few. In embodiments, the fleet configuration instructions may be in a data format associated with the communication module 104. In embodiments, the translator module 114 may also provide the configuration information to the unmanned aerial vehicle communications module 212. In embodiments, the translator module 114 may receive the proximity information from the communications module 104.

In embodiments, the respective unmanned aerial vehicle communications module 212 implemented by a respective autonomous control system 224 associated with the respective unmanned aerial vehicle 112-1 may obtain the respective fleet configuration instructions via the respective translator module 114. In embodiments, the respective fleet configuration instructions may be obtained by the respective unmanned aerial vehicle communications module 212 from the communications module 104 of the autonomous ground control system 104.

In embodiments, the unmanned aerial vehicle 112-1 may be associated with a respective role in the set of unmanned aerial vehicles 112. In embodiments, the role manager module 210 may be configured to determine the respective role for the unmanned aerial vehicle 112-1. In embodiments, the role determination may be made based on the role negotiation data. That is, in embodiments, there may be one or more roles to be assigned to each unmanned aerial vehicle in the set in order for the set to carry out tasks indicated by the one or more flight commands. For example, in embodiments, the role manager module 210 may determine that the unmanned aerial vehicle 112-1 should be the leader of the set of unmanned aerial vehicles 112 in order to carry out the indicated task. In embodiments, the leader may be in the most optimal position to carry out the task or serve as a waypoint or central point in the set of unmanned aerial vehicles based on the position matrix of unmanned aerial vehicles and the role negotiation data. In embodiments, in another example, the role manager module 210 may determine that the unmanned aerial vehicle 112-1 should be a follower of a leader unmanned aerial vehicle in order to carry out the indicated task. In embodiments, there may be a different unmanned aerial vehicle in the set which is in a more optimal position to serve as the waypoint or central point in the set. In embodiments, the respective role (or mode) may be communicated by the role manager module 210 to the respective unmanned aerial vehicle communications module 212 and the flight controller gateway 208. In embodiments, the role manager module 210 may determine that the unmanned aerial vehicle 112-1 should be in a swarm role where the respective unmanned aerial vehicle is a member of a set of unmanned aerial vehicles carrying out a set of fleet configuration instructions.

In embodiments, the role manager module 210 may determine, based on respective fleet configuration instructions, that the unmanned aerial vehicle 112-1 should be in an individual role in the set of unmanned aerial vehicles 112 in order to carry out a task indicated by the one or more flight commands. In embodiments, if a respective unmanned aerial vehicle is in an individual role, the mission task controller 216 implemented by the autonomous control system 224 may be active instead of the swarm controller 220. In embodiments, if the mission task controller 216 is active, object avoidance will take place with respect to other unmanned aerial vehicles in the set and other known objects, but the unmanned aerial vehicle in the individual role will be controller without regard for the respective fleet configuration instructions published to the set of unmanned aerial vehicles 112. For example, in embodiments, the respective fleet configuration instructions may include instructions for each unmanned aerial vehicle in the set to proceed to a certain three-dimensional location. However, in embodiments, subsequent one or more flight commands may be obtained from the one or more devices via the one or more user interface applications 102-n which indicate that one of the unmanned aerial vehicles in the set should break away from the set of unmanned aerial vehicles to carry out a separate task. In embodiments, the respective role manager module 210 may determine which unmanned aerial vehicle in the set is best suited to carry out the respective fleet configuration instructions for carrying out the task (e.g., the individual role), and communicate the individual role to the respective unmanned aerial vehicle communications module 212. In embodiments, the respective unmanned aerial vehicle communications module 212 may provide instructions to switch the active controller from the respective swarm controller 220 to the respective mission task controller 216, so that the respective unmanned aerial vehicle with the individual role may complete the task without influence by the rest of the set of unmanned aerial vehicles.

In embodiments, the role associated with a respective unmanned aerial vehicle may be determined based on a predetermined mode of operation associated with the set of unmanned aerial vehicles 112. For example, in embodiments, the predetermined mode of operation for the set may be a mission task mode. In embodiments, the predetermined mode of operation for the set may be a collision avoidance mode. In embodiments, the predetermined mode of operation for the set may be a surveillance mode. In embodiments, the predetermined mode of operation may be a swarm mode, such that the set of unmanned aerial vehicle move in a desired formation aerially.

In embodiments, the respective unmanned aerial vehicle communications module 212 may obtain respective proximity information associated with each unmanned aerial vehicle in the set of unmanned aerial vehicles 112 from a respective unmanned aerial vehicle position system 206. In embodiments, the proximity information may indicate a respective distance between each unmanned aerial vehicle of the set of unmanned aerial vehicles 112 and all other objects in an area of interest including the other unmanned aerial vehicles in the set of unmanned aerial vehicles 112. In embodiments, the respective proximity information may include potential collision information. In embodiments, the respective proximity information may include respective three-dimensional direction information. In embodiments, the respective proximity information may include respective time information associated with each respective distance.

Figure 3:
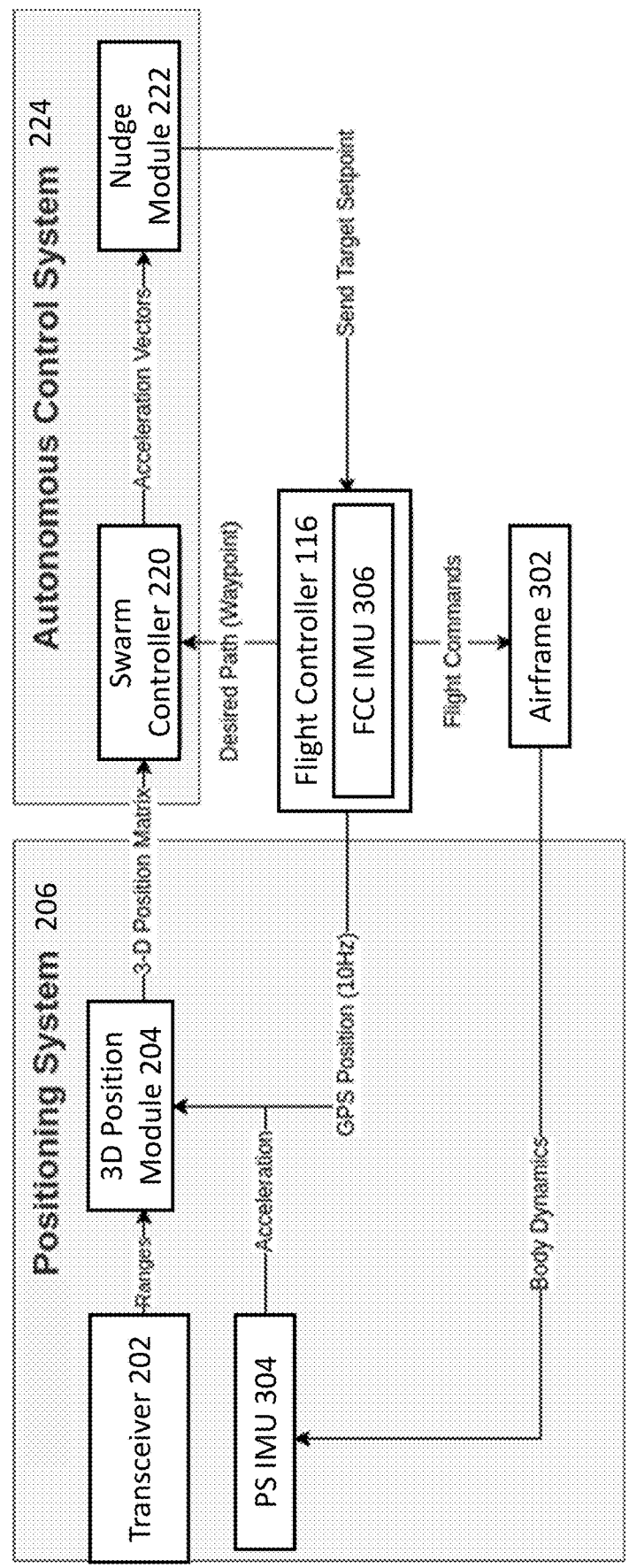
FIG. 3 is a schematic diagram of an unmanned aerial vehicle in a set of unmanned aerial vehicles in accordance with embodiments of the present invention.

FIG. 3 is a schematic diagram of an unmanned aerial vehicle 112-1 in a set of unmanned aerial vehicles 112 in accordance with embodiments of the present invention. In embodiments, the unmanned aerial vehicle 112-1 may include an autonomous control system 224, a positioning system 206, a flight controller 116, and an airframe 302. In embodiments, the positioning system 206 may include a transceiver 202, a 3D position module 204, and positioning system inertial measurement unit (PS IMU) 304. In embodiments, the transceiver 202 may transmit a plurality of range requests for receipt by the transceivers associated with each other unmanned aerial vehicle of the set of unmanned aerial vehicles 112. In embodiments, the transceiver 202 may receive responses to the requests from which range information may be determined. In embodiments, the unmanned aerial vehicle 112-1 may use the transceiver 202 to range between the set of unmanned aerial vehicles 112 in order to determine a position of the unmanned aerial vehicle 112-1 with respect to each respective unmanned aerial vehicle in the set of unmanned aerial vehicles 112. In embodiments, the transceiver 202 may use asymmetric double sided two-way ranging to determine a position of the unmanned aerial vehicle 112-1 with respect to each unmanned aerial vehicle in the set. In embodiments, the PS IMU 304 may be configured to generate movement information including three-dimensional acceleration information associated with the unmanned aerial vehicle 112-1. In embodiments, the PS IMU 304 may include a gyroscope, an accelerometer, and a magnetometer. In embodiments, the gyroscope may be configured to generate angular information associated with a measured angular velocity of the unmanned aerial vehicle 112-1. In embodiments, the angular information may be angular velocity information. In embodiments, the accelerometer may be configured to generate acceleration information associated with a measured acceleration of the unmanned aerial vehicle 112-1. In embodiments, the magnetometer may be configured to generate magnetic field information associated with a measured magnetic field at the unmanned aerial vehicle 112-1. In embodiments, the PS IMU 304 may provide the movement information to the 3D position module 204.

In embodiments, 3D position module 204 may also obtain GPS position information from the flight controller 116. In embodiments, the flight controller 116 may have its own inertial measurement unit (FCC IMU) 306. In embodiments, the 3D position module 204 may obtain the range information from the ultrawideband transceiver 202, the movement information from the PS IMU 304, and the GPS position information flight controller 116. In embodiments, each information may be obtained at a sampling rate. For example, in embodiments, information may be generated and transmitted at 1 Hz, 5 Hz, 10 Hz, 20 Hz, to name a few. In embodiments, the 3D position module 204 may use the range information, the movement information, and the GPS position information, to generate respective proximity information (e.g., a three-dimensional position matrix) indicating the three-dimensional distances associated with each unmanned aerial vehicle in the set of unmanned aerial vehicles 112 with respect to the first respective unmanned aerial vehicle 112-1. In embodiments, the respective proximity information (e.g., three-dimensional position matrix) may be provided to the swarm controller 220 of the autonomous control system 224 via the respective unmanned aerial vehicle communications module 212.

In embodiments, the swarm controller 220 implemented by the autonomous unmanned aerial vehicle control system 224 may determine in real time whether the respective proximity information associated with the respective unmanned aerial vehicle 112-1 of the set of unmanned aerial vehicles 112 indicates a distance between the respective unmanned aerial vehicle 112-1 and any other object is below a predetermined threshold. In embodiments, the swarm controller 220 may use the desired path or waypoint information and the respective proximity information (e.g., three-dimensional position matrix) to generate one or more acceleration vectors for the set of unmanned aerial vehicles 112. In embodiments, the swarm controller 220 may implement one or more algorithms for maintaining a threshold distance between all nodes within the set of unmanned aerial vehicles 112, while moving the set in a general direction.

In embodiments, in the case where the respective proximity information indicates a distance below the predetermined threshold between the respective unmanned aerial vehicle 112-1 and any other object, the swarm controller 220 may update the respective fleet configuration instructions based on the respective proximity information. In embodiments, the swarm controller 220 may then transmit or otherwise provide the updated respective fleet configuration instructions to the respective flight controller 116 of the respective unmanned aerial vehicle 112-1. In embodiments, in the case where the respective proximity information indicates that the distance between the respective unmanned aerial vehicle 112-1 in the set of unmanned aerial vehicles 112 and any other object is at or above the predetermined threshold, the swarm controller 220 may transmit the respective fleet configuration instructions to the respective flight controller 116.

In embodiments, the end result may be using the acceleration vectors to direct movement of the set of unmanned aerial vehicles 112 uniformly as a swarm, to simulate native swarm behavior. In embodiments, the steps performed by the respective unmanned aerial vehicle communications module 212 and the respective swarm controller 220 are repeated until the respective fleet configuration instructions are completed. In embodiments, the steps performed by the respective unmanned aerial vehicle communications module 212 and the respective swarm controller 220 may be repeated in real time during one or more periods of time. In embodiments, the swarm controller 220 may provide the one or more acceleration vectors to the nudge module 222. In embodiments the nudge module 222 may use an API in conjunction with a pathfinding protocol to provide control signal information to the flight controller 116. In embodiments, the pathfinding protocol may be used to establish a path (or target set point) for the set of unmanned aerial vehicles 112 to reach the desired waypoint or location while maintaining the threshold distance and avoiding collisions. In embodiments, the nudge module 222 may then send the path or target set point to the flight controller 116 to execute the respective fleet configuration instructions.

In embodiments, the respective flight controller 116 may generate a plurality of control signals to direct movement of the respective unmanned aerial vehicle 112-1 based on the respective fleet configuration instructions. For example, in embodiments, the flight controller 116 may provide signals to one or more electronic speed controllers which may direct the operation of one or more motors located on the unmanned aerial vehicle 112-1. In embodiments, the control signals may be used to direct movement of the unmanned aerial vehicle 112-1 such that the flight command is achieved. In embodiments, the flight controller 116 may include a navigation system. In embodiments, the flight controller 116 may implement the ArduPilot software suite for automatic control and movement of the unmanned aerial vehicle 112-1. In embodiments, the flight controller 116 may implement the PX4 Autopilot software suite for automatic control and movement of the unmanned aerial vehicle 112-1. In embodiments, the steps performed by the respective unmanned aerial vehicle communications module 212 and the respective swarm controller 220 are repeated until the respective fleet configuration instructions are completed.

In embodiments, after obtaining the first fleet configuration information, the translator module 114 may generate flight control information for use by the flight controller 116 of the unmanned aerial vehicle 112-1 based on the fleet configuration instructions. In embodiments, the fleet configuration instructions may be in a first data format. In embodiments, the flight control information may be in a second data format. In embodiments, the second data format may be Micro Air Vehicle Link (MAVLink) protocol, which is a protocol used for communication in unmanned aerial systems. In embodiments, the fleet configuration instructions may be used to select a mode of operation for the unmanned aerial vehicle 112-1. In embodiments, the translator module 114 may be configured to transmit flight control information to the flight controller 116 via a flight controller gateway 208. In embodiments, the flight control gateway 208 may serve as a filter to the flight controller 116 so that conflicting fleet configuration instructions cannot be transmitted to the flight controller 116 simultaneously. For example, in embodiments, the flight control gateway 208 may be configured to sort fleet configuration instructions that it receives based on predetermined priority information associated with the source of the fleet configuration instructions. In embodiments, high priority fleet configuration instructions may be passed to the flight controller 116, and low priority fleet configuration instructions may either be transmitted subsequently to the flight controller 116, or filtered out completely. In embodiments, the predetermined priority information may be based on the mode of operation of the unmanned aerial vehicle 112-1. For example, in embodiments, if the set of unmanned aerial vehicles 112 is in a mission task mode where the mission task controller 216 is active, a remote user providing flight commands may be given a high priority in providing flight controls to the one or more unmanned aerial vehicles in the set. However, in embodiments, if the set of unmanned aerial vehicles 112 is in a collision avoidance mode where the emergency controller 218 is active, a local user proximate providing flight commands may be given the highest priority to provide flight commands and may override other user inputs to the system.

In embodiments, the flight controller gateway 208 may be provided with mode information associated with the unmanned aerial vehicle 112-1. In embodiments, the flight controller gateway 208 may ensure that fleet configuration instructions may only be passed to the flight controller 116 from one controller at a time. In embodiments, for example, the flight controller gateway 208 may ensure that, if the unmanned aerial vehicle is in mission task mode based on the received flight configuration, flight commands may only be received from the mission task controller 216.

In embodiments, the communications module 104 may be configured to receive respective three-dimensional position information associated with each unmanned aerial vehicle in the set of unmanned aerial vehicles 112. In embodiments, the respective three-dimensional position information may be GPS information received from a respective navigation system of the respective flight controller IMU 306 of the respective unmanned aerial vehicle. In embodiments, each respective navigation system may be configured to generate respective three-dimensional position information in real time.

In embodiments, the communications module 104 may be configured to publish an updated configuration of the set of unmanned aerial vehicles 112 to the one or more user devices via the one or more respective user interface applications 102 based on the respective three-dimensional position information. In embodiments, the updated configuration may indicate the three-dimensional location of each unmanned aerial vehicle in the set of unmanned aerial vehicles 112 as they carry out the respective fleet configuration instructions in real time. In embodiments, information associated with the updated configuration of the set of unmanned aerial vehicles 112 may be stored in data storage 108 in order to store a log of position information associated with the set.

In embodiments, the one or more users may subscribe to one or more specific unmanned aerial vehicles via the respective one or more user interface applications 102 by communicating with the respective unmanned aerial vehicle communications module 212. In embodiments, the respective unmanned aerial vehicle communications module 212 may provide similar services as the communications module 104, while being specific to an unmanned aerial vehicle 112-1. In embodiments, the respective unmanned aerial vehicle communications module 212 may publish the updated configuration of the respective unmanned aerial vehicle 112 to the one or more user devices via the one or more respective user interface applications 102.

In embodiments, the respective unmanned aerial vehicle communications module 212 may be used to negotiate roles amongst the unmanned aerial vehicles in the set of unmanned aerial vehicles 112. For example, in embodiments, the respective unmanned aerial vehicle communications module 212 may receive fleet configuration instructions from the translator module 114. In embodiments, the fleet configuration instructions may include mode information indicating which control mode the unmanned aerial vehicle should be in. In embodiments, for example, the respective unmanned aerial vehicle communications module 212 may use the position matrix generated by the positioning system 206 to determine whether the unmanned aerial vehicle is best suited as an individual role, a swarm role, a leader role or a follower role for carrying out the fleet configuration instructions. In embodiments, the respective unmanned aerial vehicle communications module 212 may transmit the role information associated with the unmanned aerial vehicle 112-1 for carrying out the fleet configuration instructions to the communications module 104. In embodiments, the mission controller 214 may receive the role information from the respective unmanned aerial vehicle communications module 214. In embodiments, the mission controller 214 may determine the navigation mode based on the role information for the respective unmanned aerial vehicle in the set of unmanned aerial vehicles. In embodiments, the mission controller 214 may select an active controller based on the navigation mode. for example, in embodiments, the mission controller 214 may determine that the mission task controller 216 should be active for the unmanned aerial vehicle 112. In embodiments, the active controller may be transmitted to the respective unmanned aerial vehicle communications module 212. In embodiments, the respective unmanned aerial vehicle communications module 212 may determine which controller will be active. In embodiments, the active controller information and role information may be transmitted to the flight controller gateway 208 via the role manager module 210. In embodiments, the flight controller gateway 208 will ensure that the flight control information passed to the flight controller 116 is being received only from the correct active controller. In embodiments, this may ensure that conflicting communications may not be passed to the flight controller 116.

In embodiments, the flight controller 116 may generate a plurality of control signals to cause the unmanned aerial vehicle to move aerially along the path to the target set point. In embodiments, the movement of the unmanned aerial vehicle 112-1 may be guided by signals generated by one or more electronic speed controllers located in the airframe 302, which may control operation of one or more motors. In embodiments, the body dynamics of the unmanned aerial vehicle 112-1 may be analyzed by the PS IMU 304 to generate updated movement information.

Figure 4:
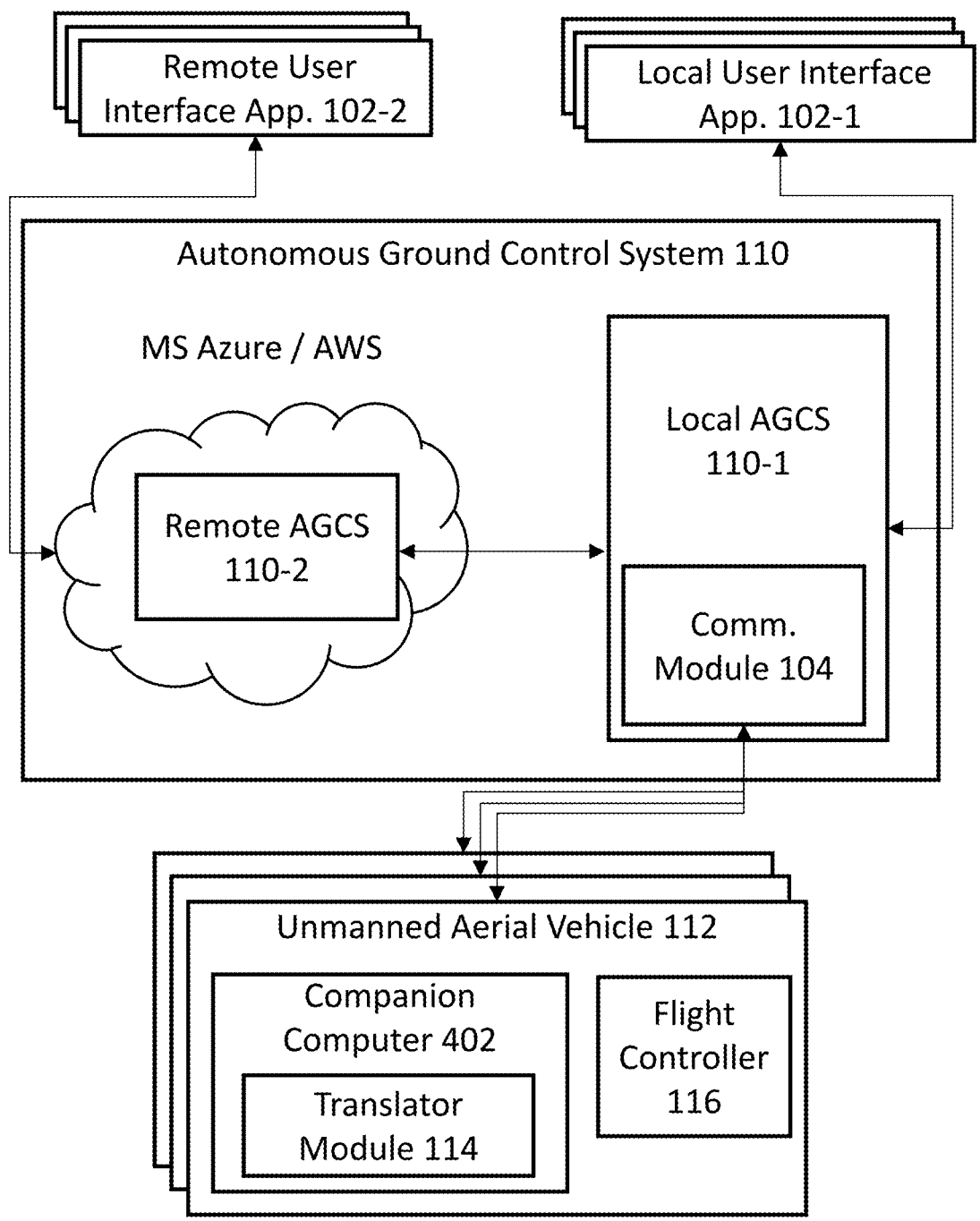
FIG. 4 is a schematic diagram of an autonomous ground control system for autonomously controlling a set of unmanned aerial vehicles in accordance with embodiments of the present invention.

FIG. 4 is a schematic diagram of an autonomous ground control system 110 for autonomously controlling a set of unmanned aerial vehicles 112 in accordance with embodiments of the present invention. In embodiments, the autonomous ground control system 110 may be segregated into a local autonomous ground control system 110-1 located proximately to the set of unmanned aerial vehicles 112, and a remote autonomous ground control system (AGCS) 110-2 located remotely from set of unmanned aerial vehicles 112. In embodiments, the remote AGCS 110-2 may be a cloud-based system located on one or more remote servers. In embodiments, the remote AGCS 110-2 may use one or more cloud computing services such as, for example, Microsoft Azure or Amazon Web Services, to name a few. In embodiments, the remote AGCS 110-2 may receive one or more flight commands from one or more remote user interface applications 102-2. In embodiments, the flight commands may be communicated to the remote AGCS 110-2 via a secure connection such as a WebSocket API protocol. In embodiments, the remote AGCS 110-2 may communicate the one or more flight commands to a communication module 104 of the local AGCS 110-1. In embodiments, the local AGCS 110-1 may include a fleet configuration module and data storage. In embodiments, the local AGCS 110-2 may receive one or more flight commands from one or more local user interface applications 102-1. In embodiments, the one or more flight commands may be obtained by the fleet configuration module. In embodiments, the one or more flight commands may be obtained by the communications module 104 from the one or more local user interface applications 102-1 by a wireless connection via the Internet. For example, in embodiments, a user operating a user device located proximately to the local AGCS 110-1 may provide flight commands for the set of unmanned aerial vehicles 112 via the user interface application 102 stored on the user device. In embodiments, the flight commands may be communicated to the local AGCS 110-1 via a secure connection. In embodiments, the one or more flight commands may be received by the communications module 104 from the one or more local user interface applications 102-1 by a wired connection. For example, in embodiments, a user operating a user device located proximately to the local AGCS 110-1 and operatively connected to the local AGCS 110-1, may provide flight commands for the set of unmanned aerial vehicles 112 via the local user interface applications 102-1.

In embodiments, fleet configuration instructions for the set of unmanned aerial vehicles 112 may be transmitted by radio frequency communications to each unmanned aerial vehicle in the set. In embodiment, each unmanned aerial vehicle may include a companion computer 402 and a flight controller 116. In embodiments, the companion computer 402 may include at least a translator module 114. In embodiments, the companion computer 402 may include one or more software modules and memory. In embodiments, the software modules may be configured to execute instructions stored in the memory of the companion computer 402 via a processor or other processing element. In embodiments, the processor may be used to implement the modules based on instructions provided from the memory. In embodiments, the flight controller 116 may be configured to generate a plurality of control signals to direct movement of the respective unmanned aerial vehicle based on flight control information provided by the companion computer 402.

Figure 5A:
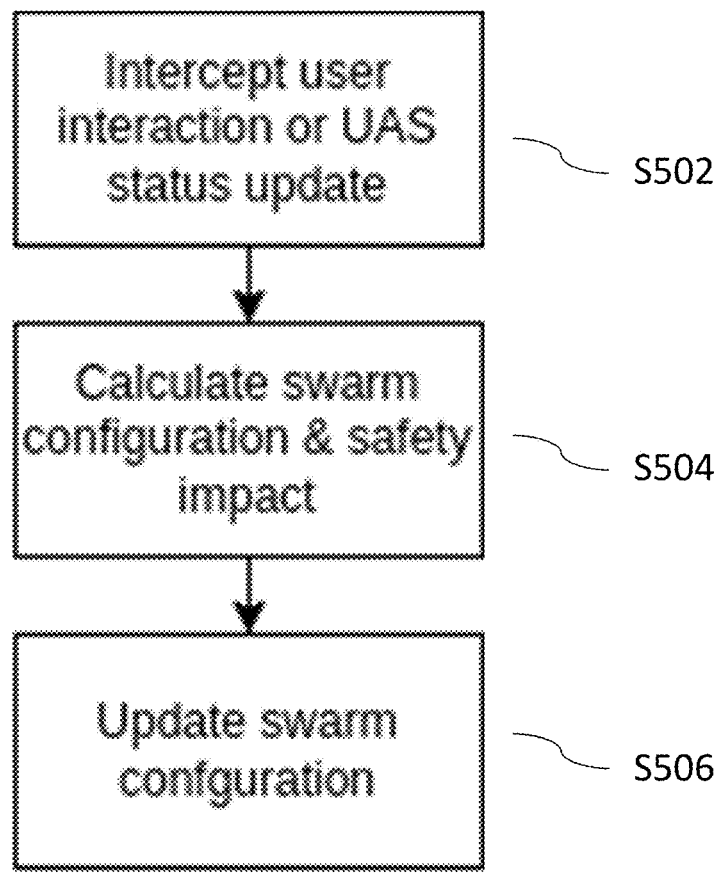
FIGS. 5A and 5B are exemplary process flows for a method for autonomously controlling a set of unmanned aerial vehicles in accordance with embodiments of the present invention.
Figure 5B:
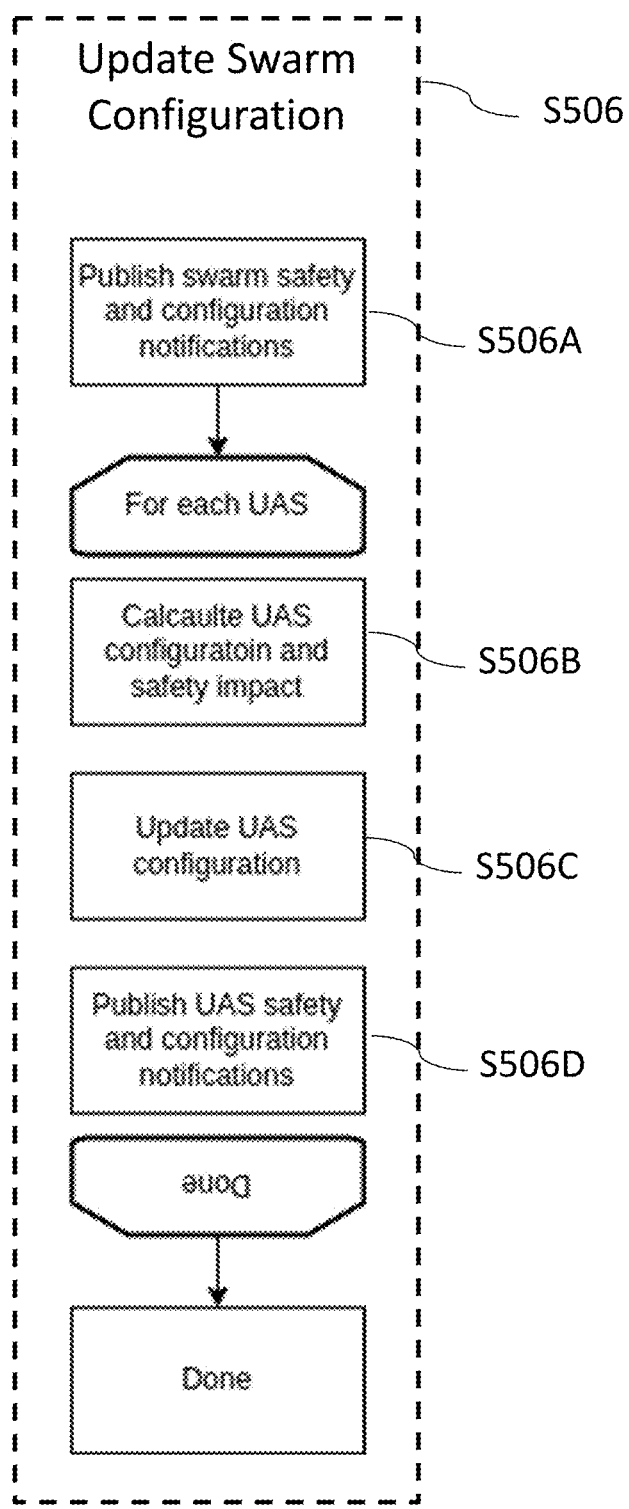

FIGS. 5A and 5B are exemplary process flows for a method for autonomously controlling a set of unmanned aerial vehicles 112 in accordance with embodiments of the present invention. Referring to FIG. 5A, the process may begin with step S502. At step S502, in embodiments, a communications module 104 may intercept user interaction information or an unmanned aerial vehicle status update via one or more user interface applications 102. Following step S502, in embodiments, the process may continue with step S504. At step S504, in embodiments, a fleet configuration module 106 may calculate swarm configuration information and safety information associated with the user interaction information or the unmanned aerial vehicle status update. In embodiments, the swarm configuration information may be fleet configuration instructions. Following step S504, in embodiments, the process may continue with step S506. At step S506, in embodiments, the communications module 104 may update the configuration of a set of unmanned aerial vehicles 112 based on the calculated swarm configuration information and safety information.

Referring to FIG. 5B, each unmanned aerial vehicle may carry out one or more sub steps to update the configuration of the set of unmanned aerial vehicles 112. In embodiments, step S506 may include one or more substeps. In embodiments, the process may continue with substep 5506A. At step S506A, in embodiments, the fleet configuration module 106 may update the configuration of a set of unmanned aerial vehicles 112 by publishing the calculated swarm configuration information to each unmanned aerial vehicle in the set of unmanned aerial vehicles 112. Following step S506A, in embodiments, the process may continue with substep 5506B. At step S506B, in embodiments, each unmanned aerial vehicle in the set may calculate its respective configuration information and respective safety impact information with respect to the other unmanned aerial vehicles in the set of unmanned aerial vehicles based on the swarm configuration information in real time. Following step S506B, in embodiments, the process may continue with step S506C. At step S506C, in embodiments, each unmanned aerial vehicle in the set may update its respective configuration by generating flight control information in order to direct movement of the respective unmanned aerial vehicle based on the respective configuration information and respective safety impact information. Following step S506C, in embodiments, the process may continue with step S506D. At step S506D, in embodiments, each unmanned aerial vehicle in the set may publish its respective configuration information to the communication module 104 after updating its respective configuration.

Figure 6:
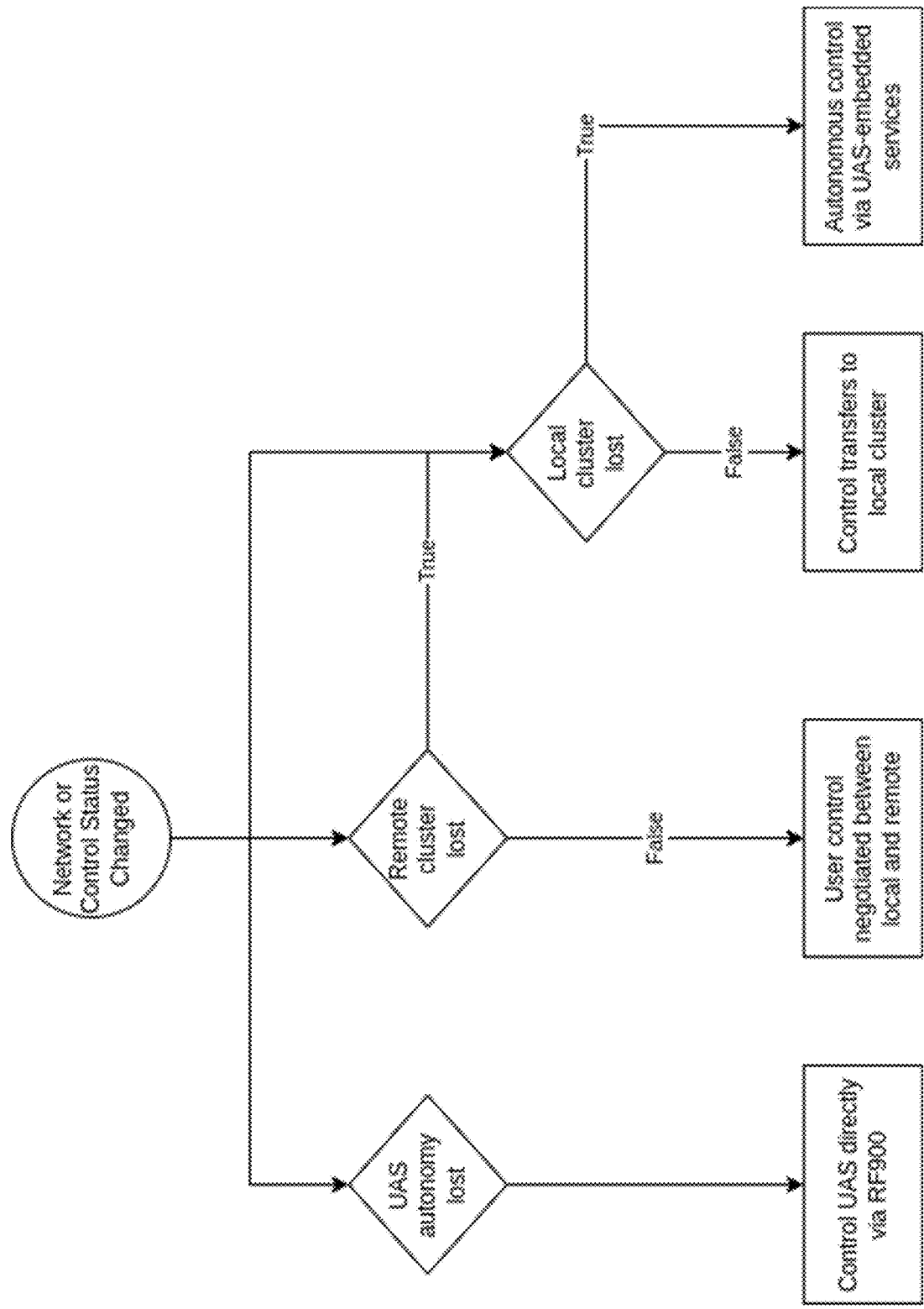
FIG. 6 is an exemplary process flow for a method for autonomously controlling a set of unmanned aerial vehicles in accordance with embodiments of the present invention.

FIG. 6 is an exemplary process flow for a method for autonomously controlling a set of unmanned aerial vehicles in accordance with embodiments of the present invention. Referring to FIG. 6, an exemplary process flow for a method for autonomously controlling a set of unmanned aerial vehicles 112 in accordance with embodiments of the present invention may begin with a determining whether there has been a change in network or control status for the set of unmanned aerial vehicles. In embodiments, a communications module 104 of an autonomous ground control system 110 may intercept user interaction or an unmanned aerial vehicle status update via one or more user interface applications 102. In embodiments, the communications module 104 may determine that there is a change in network status. For example, in embodiments, the communications module 104 may determine that autonomous control of an unmanned aerial vehicle 112-1 has been lost. In this case, in embodiments, the autonomous ground control system 110 may default control of the unmanned aerial vehicle 112-1 to manual radio frequency control by a local operator. In embodiments, local radio frequency communications may be communicated via a 900 MHz radio transceiver located on the autonomous ground control system 110. In embodiments, the communications module 104 may determine whether control of the set of unmanned aerial vehicles 112 by users operating user devices located remotely from the autonomous ground control system 110 is currently active or lost. In embodiments, if the remote control of the set of unmanned aerial vehicles 112 is active, the user control may be negotiated by the system between local and remote users. For example, in embodiments, when remote and local users are actively controlling the set of unmanned aerial vehicles 112, the autonomous ground control system 110 may use predetermined priority information to filter flight commands for the set of unmanned aerial vehicles 112. In embodiments, if the remote control of the set of unmanned aerial vehicles 112 is lost, the communications module 104 may determine whether control of the set of unmanned aerial vehicles 112 by users operating user devices located locally and proximately to the autonomous ground control system 110 is currently active or lost. In embodiments, if the local control of the set of unmanned aerial vehicles 112 is active while the remote control of the set is lost, the control of the set of unmanned aerial vehicles may be transferred to a local AGCS 110-1 of the autonomous ground control system 110. In embodiments, if the local control of the set of unmanned aerial vehicles 112 is lost and the remote control of the set is lost, the control of the set of unmanned aerial vehicles may be defaulted to autonomous control of the of unmanned aerial vehicles 112 using services embedded in respective autonomous control systems 224 within each unmanned aerial vehicle in the set of unmanned aerial vehicles 112.

Figure 7A:
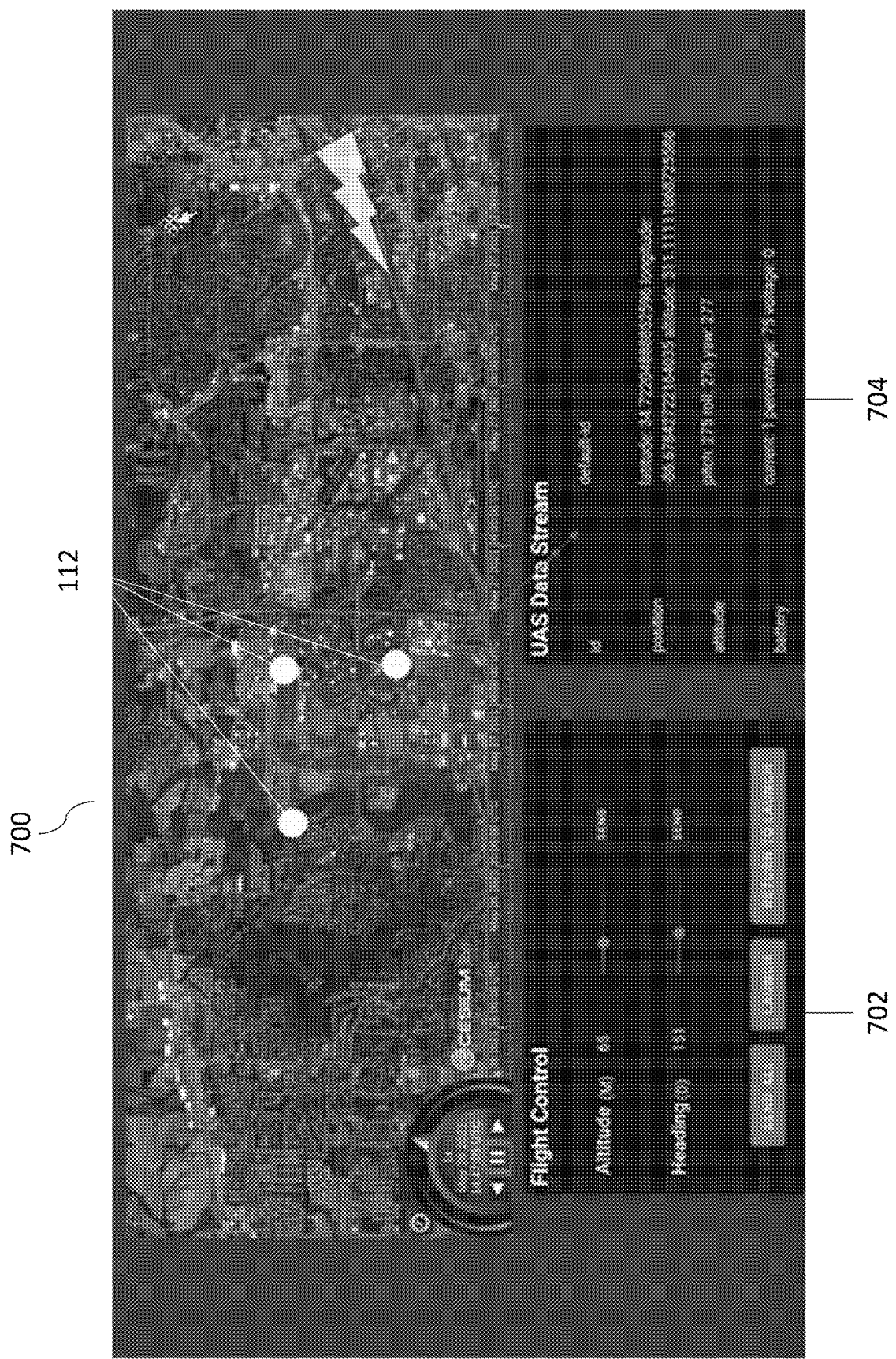
FIGS. 7A, 7B, 7C, 7D, 7E and 7F are depictions of exemplary user interfaces for a system for autonomously controlling a set of unmanned aerial vehicles in accordance with embodiments of the present invention.

FIGS. 7A, 7B, 7C, 7D, and 7E are depictions of exemplary user interfaces 700 for a system for autonomously controlling a set of unmanned aerial vehicles 112 in accordance with embodiments of the present invention. In embodiments, the user interface 700 may be generated on a user device via a user interface application 102. In embodiments, the user interface 700 may include a display showing the three-dimension location of one or more unmanned aerial vehicles in a set of unmanned aerial vehicles 112. Referring to FIG. 7A, in embodiments, the user interface 700 may include a flight control panel 702 for controlling, for example, the altitude and heading, to name a few, of one or more unmanned aerial vehicles in the set of unmanned aerial vehicles 112. In embodiments, the user interface 700 may include a data stream panel 704 which may display current information for the set of unmanned aerial vehicles 112. For example, in embodiments, the data stream panel 704 may include, unmanned aerial vehicle identification information, three-dimensional position information, attitude information, and battery information to name a few.

Figure 7B:
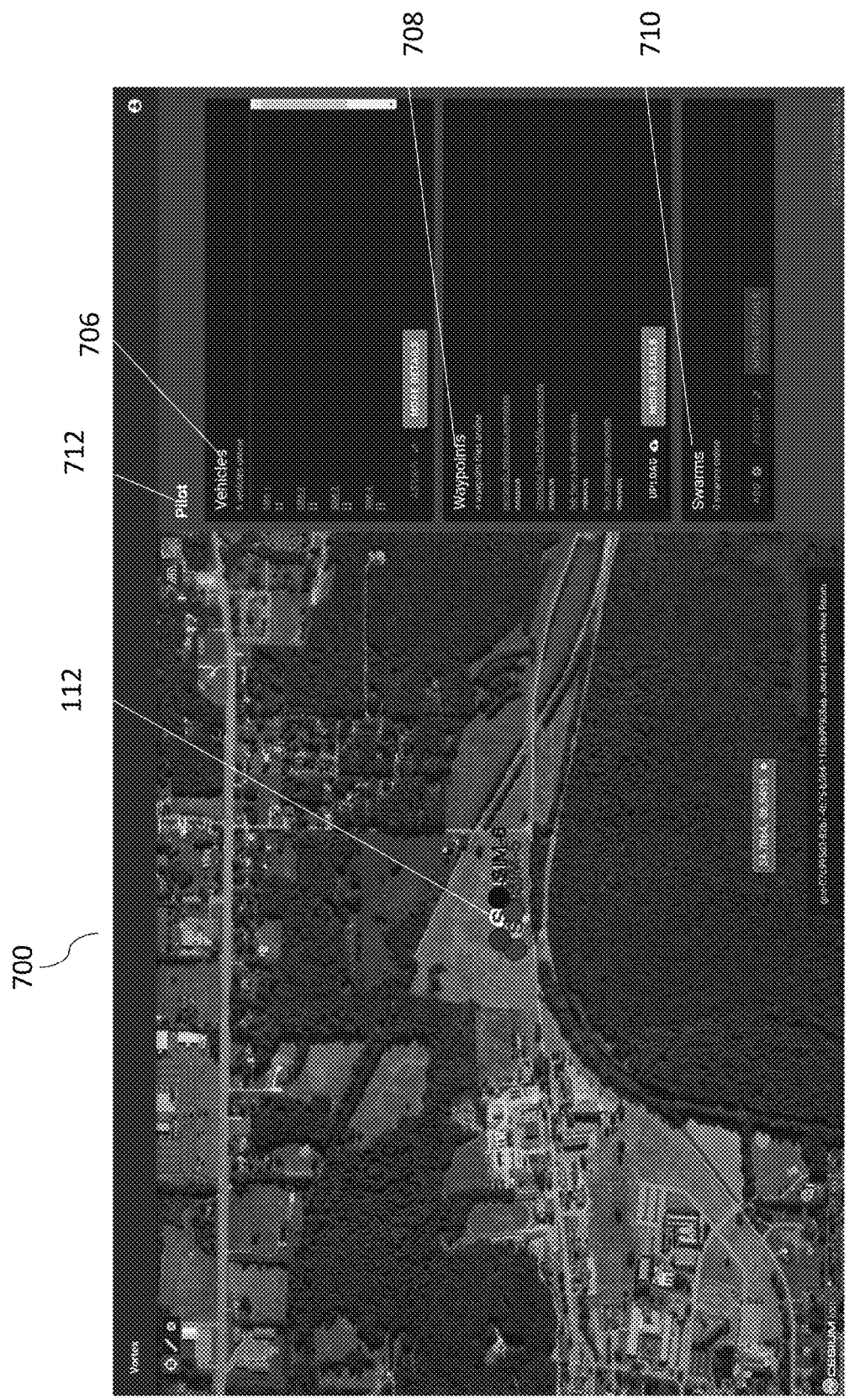

Referring to FIG. 7B, in embodiments, the user interface 700 may include a display showing the three-dimension location of one or more unmanned aerial vehicles in a set of unmanned aerial vehicles 112, and a pilot panel 712. In embodiments, the pilot panel 712 which may include a vehicles panel 706, a waypoints panel 708, and a swarms panel 710. In embodiments, the vehicles panel 706 may include a selection for each unmanned aerial vehicle in the set of unmanned aerial vehicles 112. In embodiments, the waypoints panel 708 may include a selection of one or more target waypoints or positions for the set of unmanned aerial vehicles 112. In embodiments, the selection may be a selection of a file including position information to be transmitted to each unmanned aerial vehicle in the set. In embodiments, the swarms panel 710 may include a selection of one or more sets of unmanned aerial vehicles 112.

Figure 7C:

Referring to FIG. 7C, the user interface 700 may include the display showing the three-dimension location of each unmanned aerial vehicles in the set of unmanned aerial vehicles 112 and a vehicles panel 706-1 associated with one of the unmanned aerial vehicles in the set. In embodiments, the vehicles panel 706-1 may include a display of the altitude information, heading information and battery information, to name a few, associated with the unmanned aerial vehicle. In embodiments, the vehicles panel 706-1 may include a selection for adjustment of altitude, heading, and mission controls, for example to name a few.

Figure 7D:

Referring to FIG. 7D, the user interface 700 may include the display showing the three-dimension location of each unmanned aerial vehicles in the set of unmanned aerial vehicles 112 and the vehicles panel 706 associated with each unmanned aerial vehicle in the set of unmanned aerial vehicles. In embodiments, the vehicles panel 706 may include a selection for each of the unmanned aerial vehicles in the set of unmanned aerial vehicles 112 to drill down to display more information associated with each in the set.

Figure 7E:
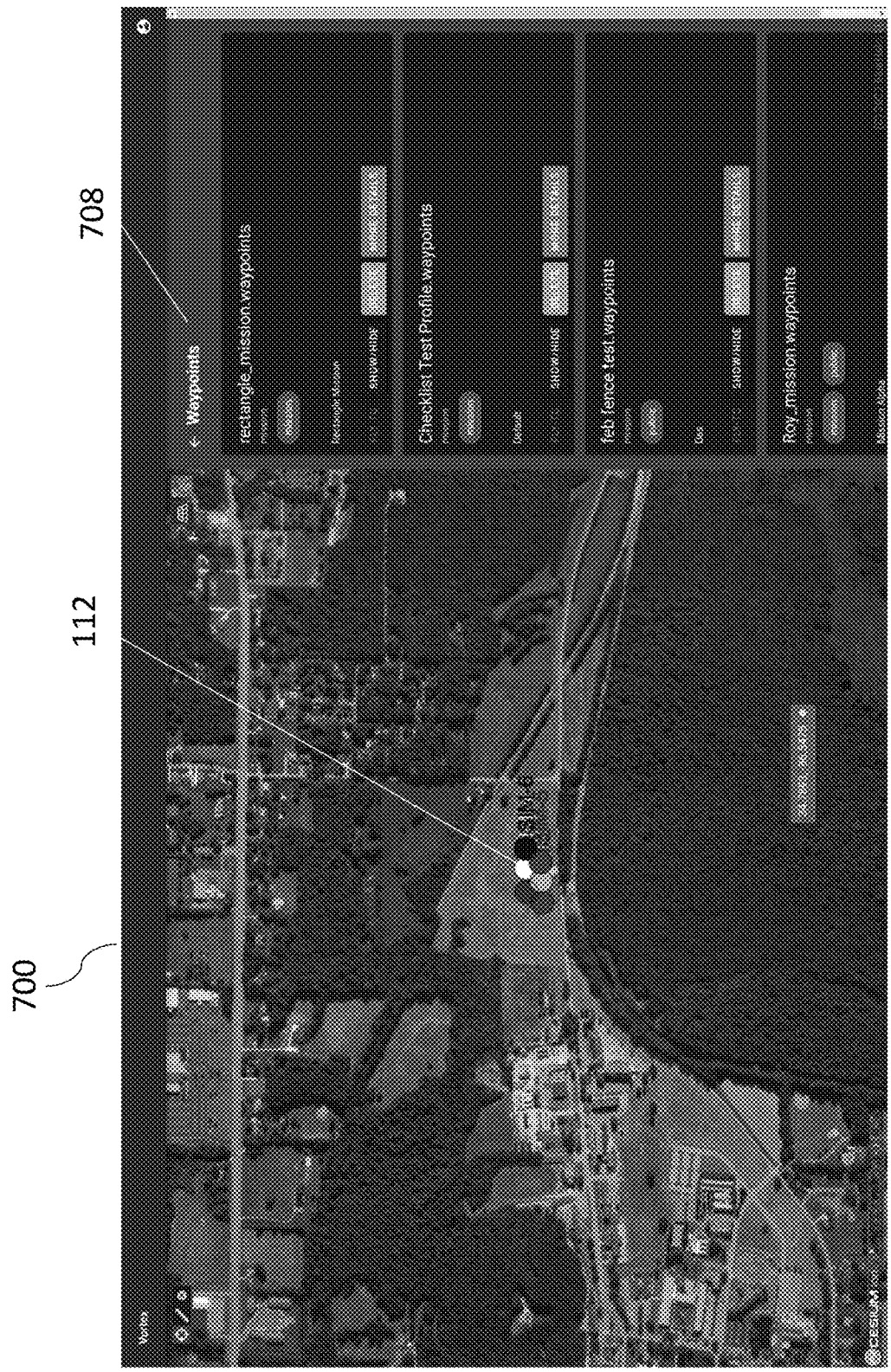

Referring to FIG. 7E, the user interface 700 may include the display showing the three-dimension location of each unmanned aerial vehicles in the set of unmanned aerial vehicles 112 and the waypoints panel 708 associated with the set of unmanned aerial vehicles. In embodiments, the waypoints panel 708 may include a selection for the set of unmanned aerial vehicles to drill down to display more information associated with one or more target waypoints or positions for the set of unmanned aerial vehicles 112.

Figure 7F:
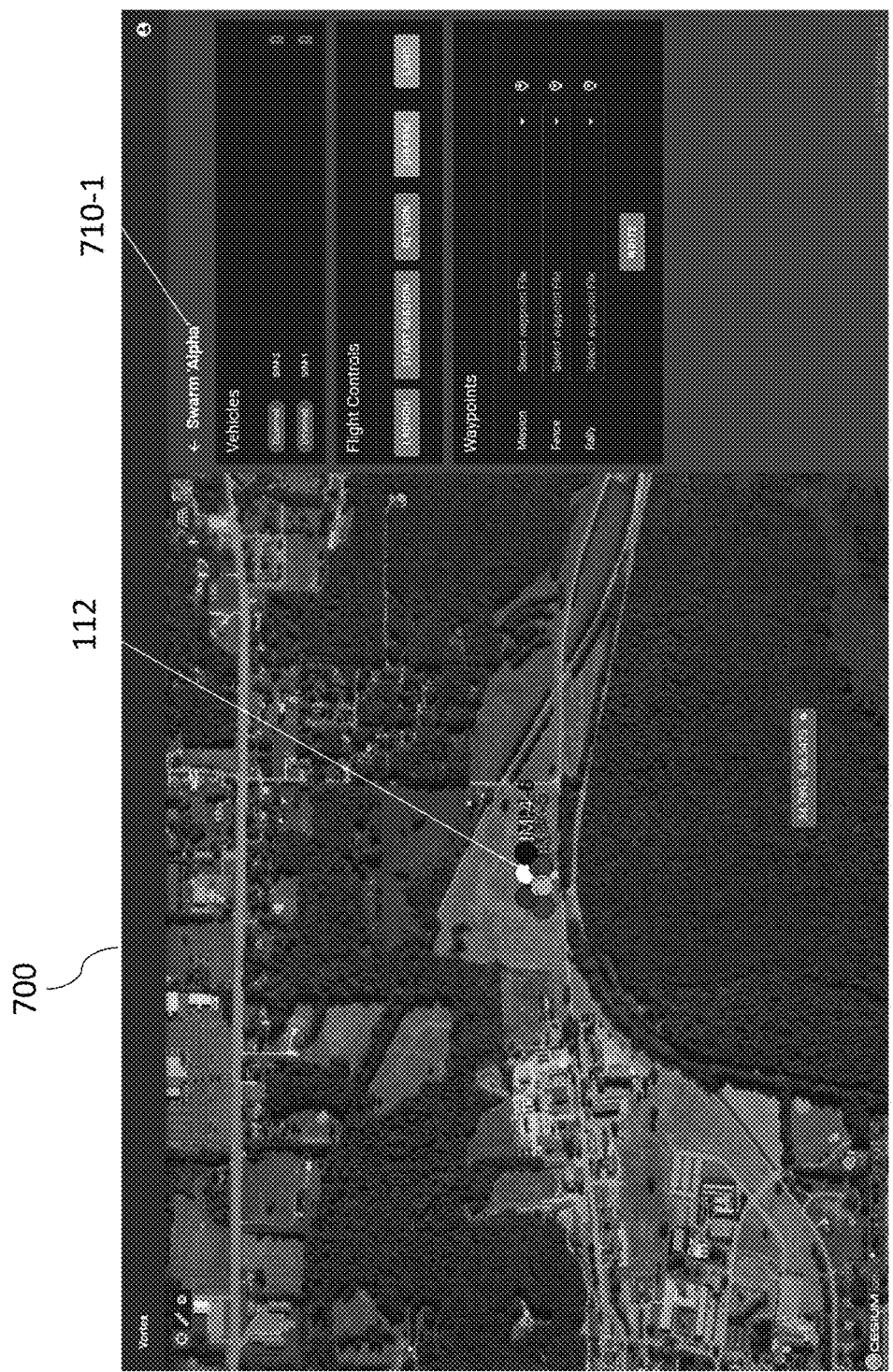

Referring to FIG. 7F, the user interface 700 may include the display showing the three-dimension location of each unmanned aerial vehicles in the set of unmanned aerial vehicles 112 and a swarm panel 710-1 associated with the set of unmanned aerial vehicles 112. In embodiments, the swarm panel 710-1 may include a display of the unmanned aerial vehicles in the set. In embodiments, the swarm panel 710-1 may include a flight controls panel for selecting one or more controls to be transmitted to the set of unmanned aerial vehicles 112. For example, in embodiments, the flight controls panel may display options for launching, landing, or returning the set of unmanned aerial vehicles, to name a few.

Figure 8A:
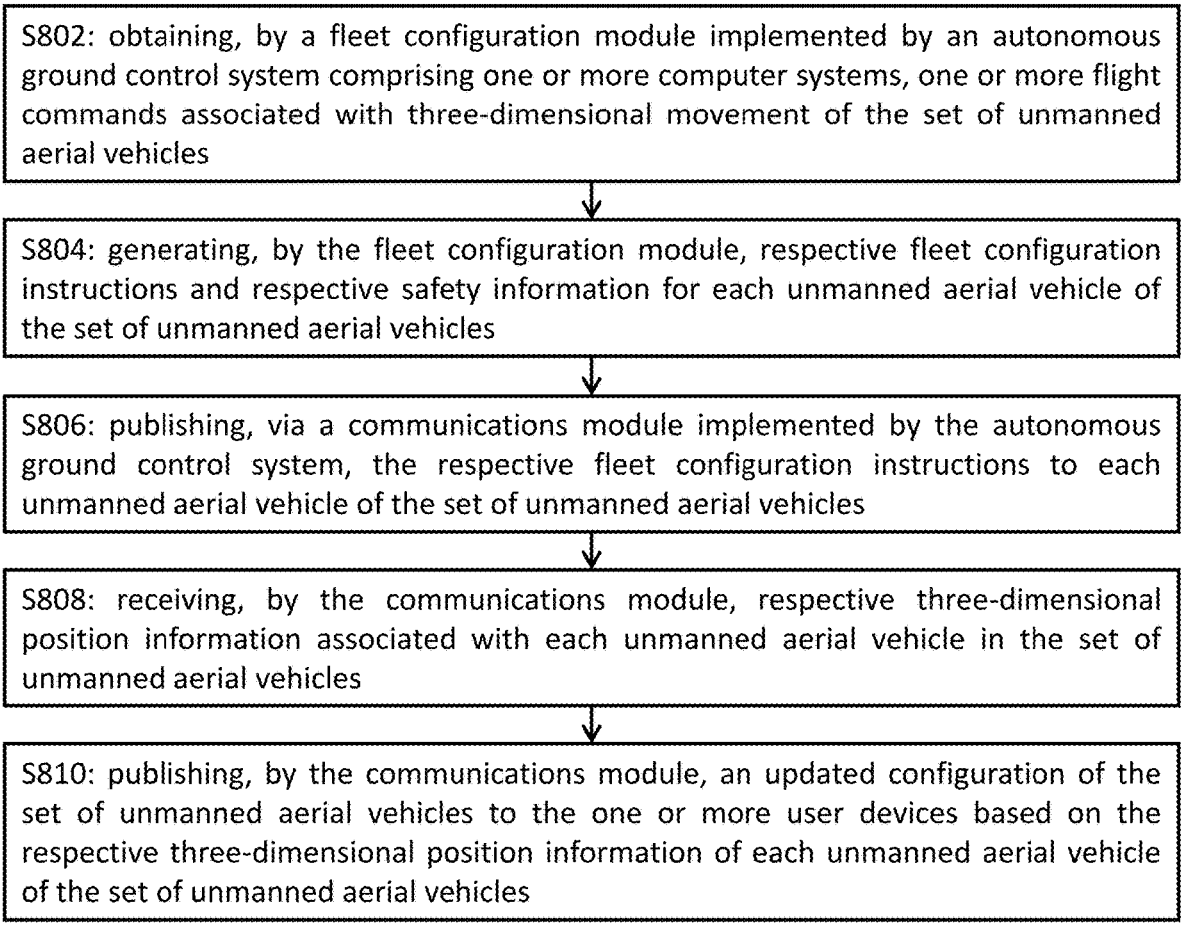
FIGS. 8A and 8B are process flows for a method for autonomously controlling a set of unmanned aerial vehicles in accordance with embodiments of the present invention.
Figure 8B:
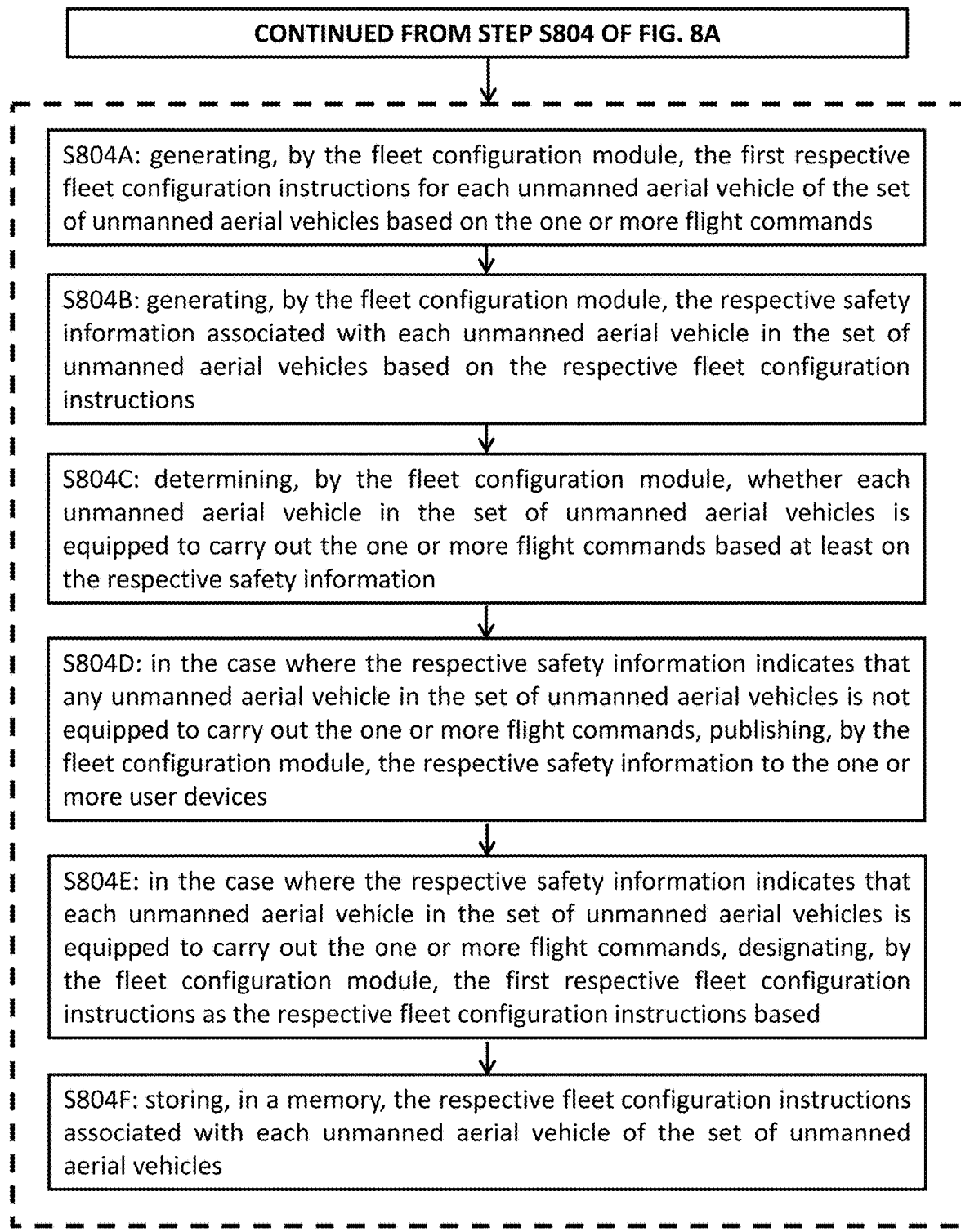

FIGS. 8A and 8B are process flows for a method for autonomously controlling a set of unmanned aerial vehicles 112 in accordance with embodiments of the present invention. In embodiments, referring to FIG. 8A, a method for autonomously controlling a set of unmanned aerial vehicles 112 may begin with step S802. At step S802, in embodiments, a fleet configuration module 106 implemented by an autonomous ground control system 110 including one or more computer systems may obtain one or more flight commands associated with three-dimensional movement of the set of unmanned aerial vehicles 112 from one or more user devices associated with the autonomous ground control system 110. In embodiments, the one or more flight commands may be obtained from the one or more devices via the communications module 104. In embodiments, the one or more flight commands may be obtained from the one or more devices via a user interface application 102. In embodiments, the user interface application is displayed on the one or more user devices. In embodiments, the one or more flight commands may be obtained remotely by wireless connection via the Internet. In embodiments, the wireless connection may be a secure connection. In embodiments, wherein the one or more flight commands may be obtained locally by a wireless connection via radio frequency communication. In embodiments, the wireless connection may be a secure connection. In embodiments, the one or more flight commands may be obtained by a wired connection.

In embodiments, the process may continue with step S804. At step S804, in embodiments, the fleet configuration module 106 may generate respective fleet configuration instructions and respective safety information for each unmanned aerial vehicle of the set of unmanned aerial vehicles. In embodiments, the generating step may include one or more substeps. Referring to FIG. 8B, in embodiments, the process may continue with substep S804A. At step S804, in embodiments, the fleet configuration module 106 may generate first respective fleet configuration instructions for each unmanned aerial vehicle in the set of unmanned aerial vehicles 112 based on the one or more flight commands.

In embodiments, the process may continue with step S804B. At step S804B, the fleet configuration module 106 may generate the respective safety information associated with each unmanned aerial vehicle in the set of unmanned aerial vehicles 112 based on the respective fleet configuration instructions. In embodiments, the respective safety information may indicate availability of each respective unmanned aerial vehicle in the set of unmanned aerial vehicles for carrying out the one or more flight commands with respect to predetermined parameters. In embodiments, the predetermined parameters may include battery level and the safety information may include battery level information associated with a respective battery level of each unmanned aerial vehicle in the set of unmanned aerial vehicles 112. In embodiments, the predetermined parameters may include mission status and the safety information may include respective mission status information associated with respective mission information loaded onto each unmanned aerial vehicle in the set of unmanned aerial vehicles 112. In embodiments, the predetermined parameters may include geographic status and the safety information may include geographic status information associated with respective geolocation information loaded onto each unmanned aerial vehicle in the set of unmanned aerial vehicles 112. In embodiments, the predetermined parameters may include position and the safety information may include respective GPS information associated with each unmanned aerial vehicle in the set of unmanned aerial vehicles 112.

In embodiments, the process may continue with step S804C. At step S804C, the fleet configuration module 106 may determine whether each unmanned aerial vehicle in the set of unmanned aerial vehicles 112 is equipped to carry out the one or more flight commands based at least on the respective safety information. In embodiments, the determining step may include determining whether the respective battery level information indicates a respective battery level over a threshold. In embodiments, the determining step may include determining that the respective mission status information is present. In embodiments, the determining step may include determining that the respective geographic status information is present. In embodiments, the determining step may include determining that sufficient GPS is available based on the respective GPS information.

In embodiments, the process may continue with step S804D. At step S804D, in the case where the respective safety information indicates that any unmanned aerial vehicle in the set of unmanned aerial vehicles 112 is not equipped to carry out the one or more flight commands, the fleet configuration module 106 may publish the respective safety information to the one or more user devices. In embodiments, if the safety information makes such an indication, the one or more flight commands would not be carried out because at least one unmanned aerial vehicle in the set is not equipped to carry out the one or more flight commands.

In embodiments, the process may continue with step S804E. At step S804E, in the case where the respective safety information indicates that each unmanned aerial vehicle in the set of unmanned aerial vehicles 112 is equipped to carry out the one or more flight commands, the fleet configuration module 106 may designate the first respective fleet configuration instructions as the respective fleet configuration instructions based on the respective safety information. In embodiments, if the safety information makes such an indication, the one or more flight commands may be carried out because each unmanned aerial vehicle in the set is equipped to carry out the one or more flight commands.

In embodiments, the process may continue with step S804F. At step S804F, the fleet configuration instructions associated with each unmanned aerial vehicle in the set of unmanned aerial vehicles 1121 may be stored in a memory.

Referring back to FIG. 8A, the process may continue with step S806. At step S806, in embodiments, the communication module 104 may publish the respective fleet configuration instructions to each unmanned aerial vehicle of the set of unmanned aerial vehicles 112.

Figure 9B:
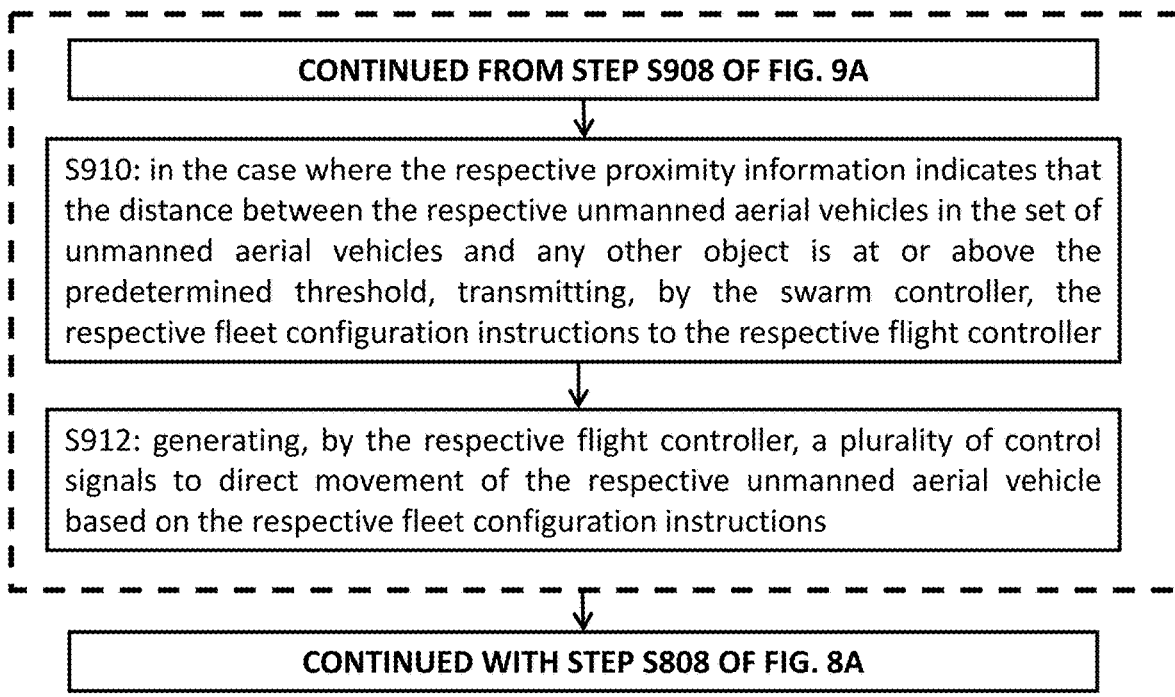

FIGS. 9A and 9B are process flows for a method for autonomously controlling a set of unmanned aerial vehicles 112 in accordance with embodiments of the present invention. Referring to FIG. 9A, in embodiments, after the fleet configuration instructions are published to each unmanned aerial vehicle, each unmanned aerial vehicle may carry out the respective fleet configuration instruction by one or more substeps. In embodiments, the process may continue with substep S902. At step S902, in embodiments, a respective unmanned aerial vehicle communications module 212 implemented by a respective autonomous unmanned aerial vehicle control system 224 associated with the respective unmanned aerial vehicle 112-1 via a respective translator module 114 implemented by the respective autonomous unmanned aerial vehicle control system 224 may obtain the respective fleet configuration instructions. In embodiments, the respective unmanned aerial vehicle 112-1 may be associated with a respective role in the set of unmanned aerial vehicles 112. In embodiments, the respective fleet configuration instructions may be obtained by the respective unmanned aerial vehicle communications module 212 from the communications module 104. In embodiments, the respective role may be an individual role. In embodiments, the respective role may be a follower role. In embodiments, the respective role may be a leader role. In embodiments, the respective role may be a follower role. In embodiments, the respective role may be determined based on a predetermined mode of operation associated with the set of unmanned aerial vehicles 112. In embodiments, the predetermined mode of operation may be a mission task mode. In embodiments, the predetermined mode of operation may be a collision avoidance mode. In embodiments, the predetermined mode of operation may be a surveillance mode. In embodiments, the predetermined mode of operation may be a swarm mode.

In embodiments, the process may continue with substep S904. At substep S904, in embodiments, the respective unmanned aerial vehicle communications module 212 may obtain respective proximity information associated with each unmanned aerial vehicle of the set of unmanned aerial vehicles 112 from a respective unmanned aerial vehicle positioning system 206. In embodiments, the proximity information may indicate a respective distance between each unmanned aerial vehicle of the set of unmanned aerial vehicles 112 and all other objects in an area of interest including the other unmanned aerial vehicles of the set of unmanned aerial vehicles 112. In embodiments, the respective proximity information may include potential collision information. In embodiments, the respective proximity information may include a respective three-dimensional direction. In embodiments, the respective proximity information may include respective time information associated with each respective distance.

In embodiments, the process may continue with substep S906. At substep S906, in embodiments, a swarm controller 220 implemented by the autonomous unmanned aerial vehicle control system 224 may determine in real time whether the respective proximity information associated with the respective unmanned aerial vehicle 112-1 of the set of unmanned aerial vehicles 112 indicates a distance between the respective unmanned aerial vehicle 112-1 and any other object is below a predetermined threshold.

In embodiments, the process may continue with substep S908. At substep S908, in the case where the respective proximity information indicates a distance below the predetermined threshold between the respective unmanned aerial vehicle 112-1 and any other object, the swarm controller 220 may update the respective fleet configuration instructions based on the respective proximity information. In embodiments, the swarm controller 220 may transmit the updated respective fleet configuration instructions to a respective flight controller 116 of the respective unmanned aerial vehicle 112-1.

In embodiments, referring to FIG. 9B, the process may continue with substep S910. At substep S910, in the case where the respective proximity information indicates that the distance between the respective unmanned aerial vehicle 112-1 in the set of unmanned aerial vehicles 112 and any other object is at or above the predetermined threshold, the swarm controller 220 may transmit the respective fleet configuration instructions to the respective flight controller 116. In embodiments, the at least one other object may be one of the unmanned aerial vehicles of the set of unmanned aerial vehicles 112. In embodiments, the at least one other object may be a stationary object. In embodiments, the at least one other object may be a stationary object and the proximity information is determined based on predetermined location information associated with the stationary object. In embodiments, the at least one other object may be an unmanned aerial vehicle outside the set of unmanned aerial vehicles 112. In embodiments, the fleet configuration instructions may be transmitted to the respective flight controller 116 via a respective flight controller gateway 208. In embodiments, the respective flight controller gateway 208 may be configured to filter respective fleet configuration instructions based on the respective role and the predetermined mode of operation.

In embodiments, the process may continue with substep S912. At substep S912, the respective flight controller 116 may generate a plurality of control signals to direct movement of the respective unmanned aerial vehicle 112-1 based on the respective fleet configuration instructions. In embodiments, substeps S904-S906 may be repeated in real time during one or more periods of time. In embodiments, substeps S904-S906 may be repeated until the fleet configuration instructions are completed.

In embodiments, referring back to FIG. 8A, the process may continue with step S808. At step S808, in embodiments, the communications module 104 may receive respective three-dimensional position information associated with each unmanned aerial vehicle 112-1 in the set of unmanned aerial vehicles 112. In embodiments, each unmanned aerial vehicle may include a respective navigation system. In embodiments, each respective navigation system may be configured to generate three-dimensional position information in real time.

In embodiments, the process may continue with step S810. At step S810, in embodiments, the communications module 104 may publish an updated configuration of the set of unmanned aerial vehicles 112 to the one or more user devices based on the respective three-dimensional position information of each unmanned aerial vehicle of the set of unmanned aerial vehicles 112. In embodiments, the process may include publishing the updated configuration to the one or more user devices via the one or more respective user interface applications 102-n. In embodiments, the process may include the respective autonomous unmanned aerial vehicle control system 224 of the respective unmanned aerial vehicle 112-1 publishing the respective updated configuration of the respective unmanned aerial vehicle 112-1 to the one or more user devices via the one or more respective user interface applications 102-n.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method for autonomously controlling a set of unmanned aerial vehicles comprising:
   a) obtaining, by a fleet configuration module implemented by an autonomous ground control system comprising one or more computer systems, one or more flight commands associated with three-dimensional movement of the set of unmanned aerial vehicles from one or more user devices associated with the autonomous ground control system;
   b) generating, by the fleet configuration module, respective fleet configuration instructions and respective safety information for each unmanned aerial vehicle of the set of unmanned aerial vehicles, by the steps of:
      i. generating, by the fleet configuration module, first respective fleet configuration instructions for each unmanned aerial vehicle of the set of unmanned aerial vehicles based on the one or more flight commands;
      ii. generating, by the fleet configuration module, the respective safety information associated with each unmanned aerial vehicle in the set of unmanned aerial vehicles based on the respective fleet configuration instructions, wherein the respective safety information indicates availability of each respective unmanned aerial vehicle in the set of unmanned aerial vehicles for carrying out the one or more flight commands with respect to predetermined parameters;

iii. determining, by the fleet configuration module, whether each unmanned aerial vehicle in the set of unmanned aerial vehicles is equipped to carry out the one or more flight commands based at least on the respective safety information;

iv. in the case where the respective safety information indicates that any unmanned aerial vehicle in the set of unmanned aerial vehicles is not equipped to carry out the one or more flight commands, publishing, by the fleet configuration module, the respective safety information to the one or more user devices;

v. in the case where the respective safety information indicates that each unmanned aerial vehicle in the set of unmanned aerial vehicles is equipped to carry out the one or more flight commands, designating, by the fleet configuration module, the first respective fleet configuration instructions as the respective fleet configuration instructions based on the respective safety information;

vi. storing, in a memory, the respective fleet configuration instructions associated with each unmanned aerial vehicle of the set of unmanned aerial vehicles;

c) publishing, via a communications module implemented by the autonomous ground control system, the respective fleet configuration instructions to each unmanned aerial vehicle of the set of unmanned aerial vehicles;

d) receiving, by the communications module, respective three-dimensional position information associated with each unmanned aerial vehicle in the set of unmanned aerial vehicles; and e) publishing, by the communications module, an updated configuration of the set of unmanned aerial vehicles to the one or more user devices based on the respective three-dimensional position information of each unmanned aerial vehicle of the set of unmanned aerial vehicles.

2. The method of claim 1, wherein the one or more flight commands are obtained from the one or more user devices via the communications module.

3. The method of claim 1, wherein the one or more flight commands are obtained from the one or more user devices via a user interface application.

4. The method of claim 3, wherein the user interface application is displayed on the one or more user devices.

5. The method of claim 1, wherein the one or more flight commands are obtained remotely by a wireless connection via the Internet.

6. The method of claim 5, wherein the wireless connection is a secure connection.

7. The method of claim 1, wherein the one or more flight commands are obtained locally by a wireless connection via radio frequency communication.

8. The method of claim 7, wherein the wireless connection is a secure connection.

9. The method of claim 1, wherein the one or more flight commands are received by a wired connection.

10. The method of claim 1, wherein the predetermined parameters include at least one of:

a) battery level and the safety information includes battery level information associated with a respective battery level of each unmanned aerial vehicle in the set of unmanned aerial vehicles;

b) mission status and the safety information includes respective mission status information associated with respective mission information loaded onto each unmanned aerial vehicle in the set of unmanned aerial vehicles;

c) geographic status and the safety information includes geographic status information associated with respective geolocation information loaded onto each unmanned aerial vehicle in the set of unmanned aerial vehicles; and d) position and the safety information includes respective GPS information associated with each unmanned aerial vehicle in the set of unmanned aerial vehicles.

11. The method of claim 1, wherein the determining step includes at least one of:

a) determining whether the respective battery level information indicates a respective battery level over a threshold;

b) determining that the respective mission status information is present;

c) determining that the respective geographic status information is present; and d) determining that sufficient GPS is available based on the respective GPS information.

12. The method of claim 1, wherein each unmanned aerial vehicle comprises a respective navigation system.

13. The method of claim 12, wherein each respective navigation system is configured to generate three-dimensional position information in real time.

14. The method of claim 1, wherein the method further comprises publishing the updated configuration to the one or more user devices via one or more respective user interface applications.

15. The method of claim 1, wherein the method further comprises publishing, by the respective autonomous unmanned aerial vehicle control system of the respective unmanned aerial vehicle, the respective updated configuration of the respective unmanned aerial vehicle to the one or more user devices via one or more respective user interface applications.

16. A method for autonomously controlling a set of unmanned aerial vehicles, wherein each respective unmanned aerial vehicle performs the steps of:

1. Obtaining, by a respective unmanned aerial vehicle communications module implemented by a respective autonomous unmanned aerial vehicle control system associated with the respective unmanned aerial vehicle via a respective translator module implemented by the respective autonomous unmanned aerial vehicle control system, respective fleet configuration instructions wherein the respective unmanned aerial vehicle is associated with a respective role in the set of unmanned aerial vehicles;

2. Obtaining, by the respective unmanned aerial vehicle communications module from a respective unmanned aerial vehicle positioning system, respective proximity information associated with each unmanned aerial vehicle of the set of unmanned aerial vehicles, wherein the proximity information indicates a respective distance between each unmanned aerial vehicle of the set of unmanned aerial vehicles and all other objects in an area of interest including the other unmanned aerial vehicles of the set of unmanned aerial vehicles;

3. Determining in real time, by a swarm controller implemented by the autonomous unmanned aerial vehicle control system, whether the respective proximity information associated with the respective unmanned aerial vehicle of the set of unmanned aerial vehicles indicates a distance between the respective unmanned aerial vehicle and any other object is below a predetermined threshold;

4. In the case where the respective proximity information indicates a distance below the predetermined threshold between the respective unmanned aerial vehicle and any other object, updating, by the swarm controller, the respective fleet configuration instructions based on the respective proximity information and transmitting, by the swarm controller, the updated respective fleet configuration instructions to a respective flight controller of the respective unmanned aerial vehicle;

5. In the case where the respective proximity information indicates that the distance between the respective unmanned aerial vehicle in the set of unmanned aerial vehicles and any other object is at or above the predetermined threshold, transmitting, by the swarm controller, the respective fleet configuration instructions to the respective flight controller; and 6. generating, by the respective flight controller, a plurality of control signals to direct movement of the respective unmanned aerial vehicle based on the respective fleet configuration instructions.

17. The method of claim 16, wherein the respective fleet configuration instructions are obtained by the respective unmanned aerial vehicle communications module from a communications module implemented by an autonomous ground control system comprising one or more computer systems.

18. The method of claim 16, wherein the respective role is an one of an individual role and a swarm role.

19. The method of claim 16, wherein the respective role is determined based on a predetermined mode of operation associated with the set of unmanned aerial vehicles.

20. The method of claim 19, wherein the predetermined mode of operation is one of:
    a) a mission task mode;
    b) a collision avoidance mode;
    c) a surveillance model; and
    d) a swarm mode.

21. The method of claim 16, wherein the respective proximity information includes at least one of:
    a) potential collision information;
    b) a respective three-dimensional direction; and
    c) respective time information associated with each respective distance.

22. The method of claim 16, wherein the at least one other object is one of the unmanned aerial vehicles of the set of unmanned aerial vehicles.

23. The method of claim 16, wherein the at least one other object is a stationary object.

24. The method of claim 16, wherein the at least one other object is a stationary object and the proximity information is determined based on predetermined location information associated with the stationary object.

25. The method of claim 16, wherein the at least one other object is an unmanned aerial vehicle outside the set of unmanned aerial vehicles.

26. The method of claim 16, wherein the fleet configuration instructions are transmitted to the respective flight controller via a respective flight controller gateway, wherein the respective flight controller gateway is configured to filter respective fleet configuration instructions based on the respective role and the predetermined mode of operation.

27. The method of claim 16, where steps 2.-6. are repeated in real time during one or more periods of time.

28. The method of claim 16, where steps 2.-6. are repeated until the fleet configuration instructions are completed.

* * * * *

UNITED STATES PATENT AND TRADEMARK OFFICE
CERTIFICATE OF CORRECTION

PATENT NO. : 11,693,432 B1
APPLICATION NO. : 17/881277
DATED : July 4, 2023
INVENTOR(S) : Alexis Henry Clark and David Beck It is certified that error appears in the above-identified patent and that said Letters Patent is hereby corrected as shown below:

In the Claims

At Column 28, Line 44, Claim 16, step 1.: please replace "Obtaining" with "obtaining".
At Column 28, Line 54, Claim 16, step 2.: please replace "Obtaining" with "obtaining".
At Column 28, Line 64, Claim 16, step 3.: please replace "Determining" with "determining".
At Column 29, Line 5, Claim 16, step 4.: please replace "In the case" with "in the case".
At Column 29, Line 15, Claim 16, step 5.: please replace "In the case" with "in the case".

Signed and Sealed this
Seventh Day of May, 2024

Katherine Kelly Vidal
*Director of the United States Patent and Trademark Office*